United States Patent
Behravan et al.

(10) Patent No.: US 10,154,420 B2
(45) Date of Patent: *Dec. 11, 2018

(54) USER EQUIPMENT, NETWORK NODE AND METHODS THEREIN

(71) Applicant: TELEFONAKTIEBOLAGET LM ERICSSON (PUBL), Stockholm (SE)

(72) Inventors: Ali Behravan, Stockholm (SE); Muhammad Kazmi, Bromma (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 20 days.

This patent is subject to a terminal disclaimer.

(21) Appl. No.: 15/288,852

(22) Filed: Oct. 7, 2016

(65) Prior Publication Data

US 2017/0026865 A1    Jan. 26, 2017

Related U.S. Application Data

(63) Continuation of application No. 13/860,325, filed on Apr. 10, 2013, now Pat. No. 9,497,644.
(Continued)

(51) Int. Cl.
    *H04W 24/10*      (2009.01)
    *H04W 24/02*      (2009.01)
(Continued)

(52) U.S. Cl.
    CPC ........... *H04W 24/02* (2013.01); *H04B 15/00* (2013.01); *H04W 24/00* (2013.01); *H04W 24/10* (2013.01);
(Continued)

(58) Field of Classification Search
    CPC ........ H04W 24/00; H04L 43/50; H04L 43/08; H04B 17/003
See application file for complete search history.

(56) References Cited

U.S. PATENT DOCUMENTS

2008/0146231 A1*   6/2008   Huang .................. H04L 1/20
                                                        455/436
2012/0020231 A1*   1/2012   Chen ................... H04W 36/08
                                                        370/252
(Continued)

FOREIGN PATENT DOCUMENTS

CN            102687548 B     10/2015
WO     WO 2012/041255 A1    4/2012
(Continued)

OTHER PUBLICATIONS

"3rd Generation Partnership Project; Technical Specification Group Radio Access Network; Evolved Universal Terrestrial Radio Access (E-UTRA); Study on signalling and procedure for interference avoidance for in-device coexistence (Release 11)", 3GPP TR 36.816 v11.0.0, Jun. 2011, the whole document.
(Continued)

*Primary Examiner* — Zhiren Qin

(57) ABSTRACT

Embodiments herein relate to a method in a user equipment (10) for performing a radio measurement in a communications network (1), which user equipment (10) is In Device Coexistent, IDC, capable and being served by a network node (12,13) in the communications network (1). The user equipment (10) receives, from the network node (12,13), an IDC configuration for at least one IDC scheme; and the user equipment (10) performs a radio measurement which meets one or more requirements related to the radio measurement provided the received IDC configuration meets a certain condition.

34 Claims, 15 Drawing Sheets

Related U.S. Application Data

(60) Provisional application No. 61/708,340, filed on Oct. 1, 2012.

(51) Int. Cl.
*H04W 24/00* (2009.01)
*H04B 15/00* (2006.01)
*H04W 72/12* (2009.01)
*H04W 88/02* (2009.01)

(52) U.S. Cl.
CPC ........ *H04W 72/1215* (2013.01); *H04W 88/02* (2013.01)

(56) References Cited

U.S. PATENT DOCUMENTS

| | | | |
|---|---|---|---|
| 2012/0040620 A1 | 2/2012 | Fu et al. | |
| 2012/0082140 A1* | 4/2012 | Lin .................. | H04W 72/1215 370/336 |
| 2012/0195298 A1 | 8/2012 | Kuo | |
| 2012/0207040 A1 | 8/2012 | Comsa et al. | |
| 2012/0281563 A1 | 11/2012 | Comsa et al. | |
| 2012/0314598 A1 | 12/2012 | Sadek et al. | |
| 2013/0114515 A1 | 5/2013 | Koo et al. | |
| 2013/0114583 A1* | 5/2013 | Park .................. | H04W 52/0216 370/338 |
| 2013/0208641 A1* | 8/2013 | Baghel .................. | H04B 1/109 370/311 |
| 2013/0242830 A1* | 9/2013 | Lee .................. | H04W 72/1215 370/311 |
| 2013/0303214 A1* | 11/2013 | Ahmadi ............ | H04W 72/1215 455/501 |
| 2014/0092761 A1* | 4/2014 | Behravan .............. | H04W 24/02 370/252 |
| 2014/0301315 A1* | 10/2014 | Wang .................... | H04W 48/02 370/329 |
| 2014/0355471 A1* | 12/2014 | Lee ...................... | H04W 24/10 370/252 |
| 2015/0099519 A1* | 4/2015 | Xu .................... | H04W 36/0055 455/436 |
| 2015/0195848 A1* | 7/2015 | Hong ................ | H04W 72/1215 455/450 |

FOREIGN PATENT DOCUMENTS

| | | |
|---|---|---|
| WO | WO 2012/047001 A1 | 4/2012 |
| WO | WO 2012/051952 A1 | 4/2012 |
| WO | WO 2012/124918 A2 | 9/2012 |
| WO | WO 2012/130175 A1 | 10/2012 |
| WO | WO 2013/085256 A1 | 6/2013 |
| WO | WO 2013/100658 A1 | 7/2013 |
| WO | WO 2013/170210 A2 | 11/2013 |

OTHER PUBLICATIONS

CMCC. Kick-off of WI on Signalling and Procedure for Interference Avoidance for In-Device Coexistence. 3GPP Draft; R2-115010 Kick-Off of WI on Signalling and Procedure for Interference Avoidance for In-Device Coexistence, 3$^{rd}$ Generation Partnership Project (3GPP), Mobile Competence Centre; 650, Route Des Lucioles; F-06921 Sophia-Antipolis Cedex; FR. vol. RAN WG2, No. Zhuhai; Oct. 10, 2011, Oct. 4, 2011 (Oct. 4, 2011), the whole document.

Ericsson/ST-Ericsson, Analysis of RRM requirements, 3GPP TSG-RAN WG4#64bis, R4-125803, Oct. 12, 2012, the whole document.

New Postcom, The remaining issues of IDC procedure, 3GPP TSG-RAN WG2#79bis, R2-124745, Sep. 28, 2012, the whole document.

Qualcomm Incorporate, "Report of Email discussion [78#51] LTE/IOC: Autonomous Denials," 3GPP TSG RAN WG2 Meeting #79, R2-123813, Aug. 6, 2012, the whole document.

Samsung, "RRM/CQI/RLM measurement in different phases of IDC," 3GPP TSG-RAN WG2 Meeting #79bis, R2-124772, Sep. 28, 2012, the whole document.

3rd Generation Partnership Project; Technical Specification Group Radio Access Networks; Evolved Universal Terrestrial Radio Access (E-UTRA); Study on Signalling and Procedure for Interference Avoidance for In-Device Coexistence; (Release 10). 3GPP Standard; 3GPP TR 36.816, 3$^{rd}$ Generation Partnership Project (3GPP), Mobile Competence Centre; 650, Route Deslucioles; F-06921 Sophia-Antipolis Cedex; France, No. v1.0.0, Dec. 17, 2010 (Dec. 17, 2010), the whole document.

3GPP TR 36.816 V11.2.0, "3$^{rd}$ Generation Partnership Project; Technical Specification Group Radio Access Network; Evolved Universal Terrestrial Radio Access (E-UTRA); Study on signalling and procedure for interference avoidance for in-device coexistence", Release 11, Jan. 3, 2012, the whole document.

3GPP TS 36.321 V11.0.0 "3d Generation Partnership Project; Technical Specification Group Radio Access Network; Evolved Universal Terrestrial Radio Access (E-UTRA); Evolved Universal Terrestrial Radio Access (E-UTRA); Medium Access Control (MAC) protocol specification", Release 11, Sep. 24, 2012, the whole document.

\* cited by examiner

USER EQUIPMENT, NETWORK NODE AND METHODS THEREIN

CROSS-REFERENCE TO RELATED APPLICATIONS

This application is a Continuation of U.S. patent application Ser. No. 13/860,325, filed on Apr. 10, 2013, now U.S. Pat. No. 9,497,644, which claims the benefit of U.S. Provisional Patent Application 61/708,340 filed Oct. 1, 2012 and is also cross referenced with the granted U.S. patent application Ser. No. 13/860,378 entitled "USER EQUIPMENT, NETWORK NODE AND METHODS THEREIN" (now U.S. Pat. No. 9,185,573), which is commonly owned. The cross referenced U.S. patent application Ser. No. 13/860,378 and the parent U.S. patent application Ser. No. 13/860,325 are incorporated herein by reference.

TECHNICAL FIELD

The present disclosure generally relates to a user equipment, a network node, and methods therein, and more particularly relates to user equipments that are capable of in device coexistence.

BACKGROUND

In a typical radio communications network, wireless terminals, also known as mobile stations and/or user equipments (UEs), communicate via a Radio Access Network (RAN) to one or more core networks. The RAN covers a geographical area which is divided into cell areas, with each cell area being served by a base station, e.g., a radio base station (RBS), which in some networks may also be called, for example, a "NodeB" in Universal Mobile Telecommunications System (UMTS) or "eNodeB" in Long Term Evolution (LTE). A cell is a geographical area where radio coverage is provided by the radio base station at a base station site or an antenna site in case the antenna and the radio base station are not collocated. Each cell is identified by an identity within the local radio area, which is broadcast in the cell. Another identity identifying the cell uniquely in the whole mobile network is also broadcasted in the cell. One base base stations communicate over the air interface operating on radio frequencies with the user equipments within range of the base stations.

In some versions of the RAN, several base stations may be connected, e.g., by landlines or microwave, to a controller node, such as a radio network controller (RNC) or a base station controller (BSC), which supervises and coordinates various activities of the plural base stations connected thereto. The RNCs are typically connected to one or more core networks.

A UMTS is a third generation mobile communication system, which evolved from the second generation (2G) Global System for Mobile Communications (GSM). The UMTS Terrestrial Radio Access Network (UTRAN) is essentially a RAN using Wideband Code Division Multiple Access (WCDMA) and/or High Speed Packet Access (HSPA) for user equipments. In a forum known as the Third Generation Partnership Project (3GPP), telecommunications suppliers propose and agree upon standards for e.g. third generation networks and further generations, and investigate enhanced data rate and radio capacity.

Specifications for the Evolved Packet System (EPS) have been completed within the 3GPP and this work continues in the coming 3GPP releases. The EPS comprises the Evolved Universal Terrestrial Radio Access Network (E-UTRAN), also known as the LTE radio access, and the Evolved Packet Core (EPC), also known as System Architecture Evolution (SAE) core network. E-UTRAN/LTE is a variant of a 3GPP radio access technology wherein the radio base stations are directly connected to the EPC core network rather than to RNCs. In general, in E-UTRAN/LTE the functions of a RNC are distributed between the radio base stations, e.g., eNodeBs in LTE, and the core network. As such, the RAN of an EPS has an essentially "flat" architecture comprising radio base stations without reporting to RNCs.

In today's mobile user equipments (UE), multiple radio transceivers are packaged inside the same device. A UE can be equipped with external wireless system i.e. non-cellular communication systems. Examples of such external wireless systems which can be located on a cellular device or UE are LTE, WiFi, Bluetooth transceivers, Global Navigation Satellite System (GNSS) receiver, sports or medical related short range wireless devices, cordless telephone etc. Examples of GNSS are Global Positioning System (GPS), Galileo, Common Positioning. Architecture for Several Sensors (COMPASS), Galileo and Additional Navigation Satellite Systems (GANSS) etc.

There are a variety of user equipments and user equipments are referred with different technical and brand names e.g. USB-dongle, target device, mobile terminal, wireless terminal, wireless terminal used for machine type communication, wireless device used for device to device communication etc. FIG. 1 shows the 3GPP frequency bands around 2.4 GHz industrial, scientific and medical (ISM) bands. The transmit power of one transmitter may be much higher than the received power level of another receiver, which due to extreme proximity of these radio transceivers, can cause interference on the victim radio receiver.

Wi-Fi uses frequency band 2400-2495 MHz in the ISM band. This band is divided into 14 channels, where each channel has a bandwidth of 22 MHz, and 5 MHz separation from other channel with an exception of channel number 14 where separation is 12 MHz. The transmitter of LTE band 40 will affect receiver of WiFi and vice-versa. Since band 7 is a Frequency Division Duplexing (FDD) band so there is no impact on LTE receiver from Wi-Fi transmitter but Wi-Fi receiver will be affected by LTE Uplink (UL) transmitter. Bluetooth operates between 2402-2480 MHz, in 79 channels of 1 MHz bandwidth each. Therefore similar to Wi-Fi, there are interference between band 40 and Bluetooth as well as interference from band 7 UL to Bluetooth Receiver (RX).

Furthermore, the reception of GNSS in the ISM band, e.g. Indian Regional Navigation Satellite System that operates 2483.5-2500 MHz, can be affected by band 7 UL transmission.

In summary some examples of interference scenarios are:
LTE Band 40 radio transmitter (TX) causing interference to ISM radio RX
ISM radio TX causing interference to LTE Band 40 radio RX
LTE Band 7 radio TX causing interference to ISM radio RX
LTE Band 7/13/14 radio TX causing interference to GNSS radio RX Note that the frequency bands and radio technologies discussed above are just examples of different possible scenarios. In general the interference can be caused by any radio technology and in any neighboring or sub harmonic frequency band.

To avoid interference from LTE transceiver to other technologies, some interference avoidance solutions can be used in the UE or by the network. Interference avoidance solution can either be done autonomously by the UE, or performed by the network based on an indication from the UE.

In the following the two methods are briefly described:

When a UE experiences a level of In Device Coexistence (IDC) interference that cannot be solved by the UE itself, the UE sends an IDC indication via dedicated Radio Resource Control (RRC) signaling to report the problems, so called Network-controlled UE-assisted Interference avoidance. Indications can be sent by the UE whenever it has problem in ISM DL reception, or in LTE DL reception. Part of the IDC indication message is interference direction, which indicates the direction of IDC interference. The triggering of IDC indication is up to UE implementation, i.e. it may rely on existing LTE measurements and/or UE internal coordination.

The information element, InDeviceCoexIndication, defined in LTE RRC specification, TS 36.331, Rel-11, v. 11.1.0 section 5.6.9 and also shown below describes the message sent by the UE to the radio base station when it experiences problem related to IDC.

The InDeviceCoexIndication message is used to inform E-UTRAN about the IDC problems experienced by the UE, any changes in the IDC problems previously informed, and to provide the E-UTRAN with information in order to resolve them.

Signalling radio bearer: SRB1
RLC-SAP: AM
Logical channel: DCCH
Direction: UE to E-UTRAN

| InDeviceCoexIndication message |
| --- |
| -- ASN1START<br>InDeviceCoexIndication-r11 ::=   SEQUENCE {<br>  criticalExtensions           CHOICE {<br>    c1                         CHOICE {<br>      inDeviceCoexIndication-r11<br>InDeviceCoexIndication-r11-IEs,<br>      spare3 NULL, spare2 NULL, spare1 NULL<br>    },<br>    criticalExtensionsFuture     SEQUENCE { }<br>  }<br>}<br>InDeviceCoexIndication-r11-IEs ::= SEQUENCE {<br>  affectedCarrierFreqList-r11<br>  AffectedCarrierFreqList-r11              OPTIONAL,<br>  tdm-AssistanceInfo-r11       TDM-AssistanceInfo-r11         OPTIONAL,<br>  lateNonCriticalExtension     OCTET STRING OPTIONAL,<br>  nonCriticalExtension         SEQUENCE { } OPTIONAL<br>}<br>AffectedCarrierFreqList-r11 ::= SEQUENCE (SIZE (1..maxFreqIDC-r11)) OF AffectedCarrierFreq-r11<br>AffectedCarrierFreq-r11 ::= SEQUENCE {<br>  carrierFreq-r11              MeasObjectId,<br>  interferenceDirection-r11    ENUMERATED {eutra, other, both, spare}<br>}<br>TDM-AssistanceInfo-r11 ::= CHOICE {<br>  drx-AssistanceInfo-r11       SEQUENCE {<br>    drx-CycleLength-r11        ENUMERATED {n1} OPTIONAL,<br>    drx-Offset-r11             ENUMERATED {n1} OPTIONAL,<br>    drx-ActiveTime-r11         ENUMERATED {n1} OPTIONAL<br>    -- The above three parameters (i.e. drx-cycleLength-r11, drx-Offset-r11 and<br>    -- drx-ActiveTime-r11) are FFS and need to be discussed<br>  }, |

| InDeviceCoexIndication message |
| --- |
|   idc-SubframePattern-r11      SEQUENCE {<br>    idc-SubframePatternList-r11     IDC-SubframePatternList-r11<br>  },<br>  ...<br>}<br>IDC-SubframePatternList-r11 ::= SEQUENCE (SIZE (1..maxSubframePatternIDC-r11)) OF IDC-SubframePattern-r11<br>IDC-SubframePattern-r11 ::= CHOICE {<br>  subframePatternFDD-r11       BIT STRING (SIZE (40)),<br>  subframePatternTDD-r11       CHOICE {<br>    subframeConfig0-r11        BIT STRING (SIZE (70)),<br>    subframeConfig1-5-r11      BIT STRING (SIZE (10)),<br>    subframeConfig6-r11        BIT STRING (SIZE (60))<br>  },<br>  ...<br>}<br>-- ASN1STOP |

When notified of IDC problems through an IDC indication from the UE, the radio base station can choose to apply Frequency Division Multiplexing (FDM) or Time Division Multiplexing (TDM) solutions.

To assist the radio base station in selecting an appropriate solution, all necessary/available assistance information for both FDM and TDM solutions is sent together in the IDC indication to the radio base station. The IDC indication is also used to update the IDC assistance information, including for the cases when the UE no longer suffers from IDC interference.

The two solutions are explained in more details in the following:

The basic concept of an FDM solution is to move the LTE signal away from the ISM band by performing inter-frequency handover within E-UTRAN. The UE informs the network when operating LTE or other radio signals would benefit or no longer benefit from LTE not using certain carriers or frequency resources. By sending a list of E-UTRA carrier frequencies affected by the IDC problem, the UE will indicate which frequencies are unusable due to in-device coexistence.

The basic concept of a TDM solution is to ensure that transmission time of a radio signal does not coincide with reception time of another radio signal of an external wireless system e.g. Wireless Local Area Network (WLAN) or GNSS. The UE can signal the necessary information, e.g. interferer type, mode, and possibly the appropriate offset in subframes to the radio base station. The UE can also signal a suggested pattern to the radio base station. Based on such information, the final TDM patterns, i.e. scheduling and unscheduled periods, are configured by the radio base station.

The TDM solutions are divided into different types of methods:

Discontinuous Reception (DRX)-based solution: LTE DRX mechanism is to provide TDM patterns to resolve the IDC issues. The TDM pattern is specified by a total length called DRX periodicity and consists of an active period, scheduling period, and an inactive period, unscheduled period, as shown in FIG. 2. The UE provides the radio base station with a desired TDM pattern consisting of periodicity of the TDM pattern and scheduling period, or unscheduled period. It is up to the network node to decide and signal the pattern that is used by the UE.

All DRX definitions are according to 3GPP TS 36.321 section 3.1 v.11.0.0. The IDC indication message includes information related to DRX cycle length which indicates the desired DRX cycle length that the E-UTRAN is recommended to configure, DRX offset which indicates the desired DRX starting offset that the E-UTRAN is recommended to configure, and DRX active time which indicates the desired active time that the E-UTRAN is recommended to configure.

Hybrid Automatic Repeat Request (HARQ) process reservation based solution: In this TDM solution, a number of LTE HARQ processes or subframes are reserved for LTE operation, and the remaining subframes are used to accommodate ISM/GNSS traffic. FIG. 3 shows as an example the HARQ reservation process for LTE Time Division Duplexing (TDD) configuration 1, 3GPP TR 36.816 v. 11.2.0 Figure 5.2.1.2.2-1. In this way interference across in-device co-existing systems can be avoided since UE does not transmit in certain subframes during which it receives ISM/GNSS signals.

Subframe reservation pattern is sent to the UE in the form of a bitmap based on the assistance information reported by the UE. The provided bitmap is a list of one or more subframe patterns indicating which HARQ process E-UTRAN is requested to abstain from using. Value 0 indicates that E-UTRAN is requested to abstain from using the subframe. As an example the bit sequence 1111110100 means that subframes number 7, 9 and 10 must not be used. The size of bit string for FDD is 40, and for TDD is 70, 10, 60 for subframe configurations 0, 1-5, and 6, respectively. The key point here is that the reserved subframes should comply with LTE release 8/9 UL and DL HARQ timing.

The UE can also deny LTE subframes autonomously, to avoid interfering with important signaling in other radio technologies. During the denied subframes the UE does not transmit any signal. It may also not receive any signal. The amount of denials is limited using a maximum allowed denial subframes over a denial validity period. Both the maximum denial subframes and the denial validity period are configured by the radio base station. Configuring a proper denial rate is left up to radio base station implementation, but the UE decides which subframes are denied, without any further feedback to the radio base station. That is why it is also called as, 'autonomous denials'. If the radio base station does not configure any denial rate, the UE shall not perform any autonomous denials.

The information element 'IDC-Config' defined in LTE RRC specification, TS 36.331, v. 11.1.0 section 6.3.6, and also shown below describes the message sent by the E-UTRAN (eNB) to the UE to release or setup autonomous denial parameters, autonomousDenialSubframes and autonomousDenialValidity.

| OtherConfig information element |
|---|
| -- ASN1START<br>OtherConfig-r9 ::= SEQUENCE {<br>reportProximityConfig-r9<br>ReportProximityConfig-r9    OPTIONAL,--<br>Need ON<br>... ,<br>[[ idc-Config-r11    IDC-Config-r11<br>OPTIONAL -- Need ON<br>]]<br>} |

| OtherConfig information element |
|---|
| IDC-Config-r11 ::= CHOICE {<br>release    NULL,<br>setup    SEQUENCE {<br>autonomousDenialParameters-r11<br>SEQUENCE {<br>autonomousDenialSubframes-r11<br>ENUMERATED {n2, n5, n10, n15,<br>n20, n30, spare2, spare1},<br>autonomousDenialValidity-r11<br>ENUMERATED {sf200, sf500, sf1000, sf2000,<br>spare4, spare3, spare2, spare1}<br>}<br>OPTIONAL, -- Need OR<br>...<br>}<br>}<br>ReportProximityConfig-r9 ::= SEQUENCE {<br>proximityIndicationEUTRA-r9    ENUMERATED<br>{enabled}    OPTIONAL,    -- Need OR<br>proximityIndicationUTRA-r9    ENUMERATED<br>{enabled}    OPTIONAL    -- Need OR<br>}<br>-- ASN1STOP |

Radio Resource Management (RRM) Measurement

Several radio related measurements are used by the UE or the radio network node to establish and keep the connection, as well as ensuring the quality of a radio link.

The RRM measurements are used in RRC idle state operations such as cell selection, cell reselection, e.g. between E-UTRANs, between different Radio Access Technologies (RAT), and to non-3GPP RATs, and minimization of drive test (MDT), and also in RRC connected state operations such as for cell change, e.g. handover between E-UTRANs, handover between different RATs, and handover to non-3GPP RATs.

Cell ID Measurements

The UE has to first detect a cell and therefore cell identification e.g. acquisition of a Physical Cell Identity (PCI), is also a signal measurement. The UE may also have to acquire the Cell Global ID (CGI) of a UE.

In HSPA and LTE the serving cell can request the UE to acquire the System Information (SI) of the target cell. More specifically the SI is read by the UE to acquire the CGI, which uniquely identifies a cell, of the target cell. The UE also be requested to acquire other information such as Closed Subscriber Group (CSG) indicator, CSG proximity detection etc from the target cell.

The UE reads the SI of the target cell, e.g. intra-, inter-frequency or inter-RAT cell, upon receiving an explicit request from the serving network node via RRC signaling e.g. from RNC in HSPA or eNode B in case of LTE. The acquired SI is then reported to the serving cell. The signaling messages are defined in the relevant HSPA and LTE specifications.

In order to acquire the SI which contains the CGI of the target cell, the UE has to read at least part of the SI including master information block (MIB) and the relevant system information block (SIB) as described later. The terms SI reading/decoding/acquisition, CGI/ECGI reading/decoding/acquisition, CSG SI reading/decoding/acquisition are interchangeably used but have the same or similar meaning. In order to read the SI to obtain the CGI of a cell the UE is allowed to create autonomous gaps during DL and also in UL. The autonomous gaps are created for example at instances when the UE has to read MIB and relevant SIBs of the cell, which depends upon the RAT. The MIB and SIBs are repeated with certain periodicity. Each autonomous gap is typically 3-5 ms in LTE and UE needs several of them to acquire the CGI.

Signal Measurements

The Reference signal received power (RSRP) and Reference signal received quality (RSRQ) are the two existing measurements used for at least RRM such as for mobility, which include mobility in RRC connected state as well as in RRC idle state. The RSRP and RSRQ are also used for other purposes such as for enhanced cell ID positioning, minimization of drive test etc.

The RSRP measurement provides cell-specific signal strength metric at a UE. This measurement is used mainly to rank different LTE candidate cells according to their signal strength and is used as an input for handover and cell reselection decisions. Cell specific Reference Signals (CRS) are used for RSRP measurement. These reference symbols are inserted in the first and third last Orthogonal Frequency Division Multiplexing (OFDM) symbol of each slot, and with a frequency spacing of 6 subcarriers. Thus within a resource block of 12 subcarriers and 0.5 ms slot, there are 4 reference symbols.

The RSRQ is a quality measure which is the ratio of the RSRP and carrier Received Signal Strength Indicator (RSSI). The latter part includes interference from all sources e.g. co-channel interference, adjacent carriers, out of band emissions, noise etc.

The UE depending upon its capability may also perform inter-RAT measurements for measuring on other systems e.g. HSPA, GSM/GSM Enhanced Data rate for GSM Evolution (EDGE) Radio Access Network (GERAN), Code Division Multiple Access CDMA2000, 1×Round Trip Time (RTT) and High Rate Packet Data (HRPD) etc. Examples of inter-RAT radio measurements which can be performed by the UE are Common Pilot Channel Received Signal Code Power (CPICH RSCP) and CPICH energy per chip over total received power spectral density (Ec/No) for inter-RAT UTRAN, GERAN carrier RSSI for inter-RAT GSM and even pilot strength measurements for CDMA2000 1×RTT/HRPD.

In RRC connected state the UE can perform intra-frequency measurements without measurement gaps. However as a general rule the UE performs inter-frequency and inter-RAT measurements in measurement gaps unless it is capable of performing them without gaps. To enable inter-frequency and inter-RAT measurements for the UE requiring gaps, the network has to configure the measurement gaps. Two periodic measurement gap patterns both with a measurement gap length of 6 ms are defined for LTE:

Measurement gap pattern #0 with repetition period 40 ms
Measurement gap pattern #1 with repetition period 80 ms The measurements performed by the UE are then reported to the network, which may use them for various tasks.

The radio network node, e.g. radio base station, may also perform signal measurements. Examples of radio network node measurements in LTE are propagation delay between UE and itself, UL Signal to Interference plus Noise Ratio (SINR), UL Signal to Noise Ratio (SNR), UL signal strength, Received Interference Power (RIP) etc. The radio base station may also perform positioning measurements which are described in a later section.

Radio Link Monitoring Measurements

The UE also performs measurements on the serving cell (aka primary cell) in order to monitor the serving cell performance. This is called as Radio Link Monitoring (RLM) or RLM related measurements in LTE.

For RLM the UE monitors the downlink link quality based on the cell-specific reference signal in order to detect the downlink radio link quality of the serving cell or Primary Cell (PCell).

In order to detect out of sync and in sync the UE compares the estimated quality with the thresholds Qout and Qin respectively. The threshold Qout and Qin are defined as the level at which the downlink radio link cannot be reliably received and corresponds to 10% and 2% block error rate of a hypothetical Physical Downlink Control Channel (PDCCH) transmissions respectively.

In non-DRX downlink link quality for out of sync and downlink link quality for in sync are estimated over an evaluation periods of 200 ms and 100 ms respectively.

In DRX downlink link quality for out of sync and downlink link quality for in sync are estimated over the same evaluation period, which scale with the DRX cycle e.g. period equal to 20 DRX cycles for DRX cycle greater than 10 ms and up to 40 ms.

In non-DRX the out of sync status and in sync status are assessed by the UE in every radio frame. In DRX the out of sync status and in sync status are assessed by the UE once every DRX.

In addition to filtering on physical layer, i.e. evaluation period, the UE also applies higher layer filtering based on network configured parameters. This increases the reliability of radio link failure detection and thus avoids unnecessary radio link failure and consequently RRC re-establishment. The higher layer filtering for radio link failure and recovery detection would in general comprise the following network controlled parameters:

Hysteresis counters e.g. N310 and N311 out of sync and in sync counters respectively.
Timers e.g. T310 Radio Link Failure (RLF) timer For example the UE starts the timer T310 after N310 consecutive Out of Sync (OOS) detections. The UE stops the timer T310 after N311 consecutive In sync (IS) detections. The transmitter power of the UE is turned off within 40 ms after the expiry of T310 timer. Upon expiry of T310 timer the UE starts T311 timer. Upon T311 expiry the UE initiates RRC re-establishment phase during which it reselects a new strongest cell.

In HSPA similar concept called out of sync and in sync detection are carried out by the UE. The higher layer filtering parameters, i.e. hysteresis counters and timers, are also used in HSPA. There is also RLF and eventually RRC re-establishment procedures specified in HSPA.

Sampling of Cell Measurement

The overall serving cell or neighbour cell measurement quantity results comprise non-coherent averaging of 2 or more basic non-coherent averaged samples. The exact sampling depends upon the implementation and is generally not specified. An example of RSRP measurement averaging in E-UTRAN is shown in FIG. 4. The FIG. 4 illustrates that the UE obtains the overall measurement quantity result by collecting four non-coherent averaged samples or snapshots, each of 3 ms length in this example, during the physical layer measurement period, i.e. 200 ms, when no DRX is used or when DRX cycle is not larger than 40 ms. Every coherent averaged sample is 1 ms long. The measurement accuracy of the neighbour cell measurement quantity, e.g. RSRP or RSRQ, is specified over this physical layer measurement period. It should be noted that the sampling rate is UE implementation specific. Therefore in another implementation a UE may use only 3 snap shots over 200 ms interval. Regardless of the sampling rate, it is important that the measured quantity fulfils the performance requirements in terms of the specified measurement accuracy.

In case of RSRQ both RSRP, numerator, and carrier RSSI, denominator, should be sampled at the same time to follow similar fading profile on both components. The sampling also depends upon the length of the DRX cycle. For example for DRX cycle >40 ms, the UE typically takes one sample every DRX cycle over the measurement period.

A similar measurement sampling mechanism is used for other signal measurements by the UE and also by the radio base station for UL measurements.

HARQ in LTE

Hybrid Automatic Repeat Request (HARQ) is a process of acknowledging the transmission in downlink or uplink. If the received data is error-free an acknowledgement is sent to the transmitter declaring a positive acknowledgement (ACK). If on the other hand, error detected in the transmission, a negative acknowledgement (NACK) is sent to the transmitter, which means that the packet must be re-transmitted. In LTE, certain timing is agreed between the transmitter and receiver for retransmissions.

In FDD mode, HARQ processes have 8 ms, 8 subframes, round trip time in both UL and DL. This means that 4 ms after transmission an ACK or NACK feedback is expected from the receiver, and if a retransmission is required 4 ms after the feedback, the packet is retransmitted.

In TDD mode since the DL and UL subframes can be different, in different UL/DL configurations, the HARQ timing is different. As an example in UL/DL configuration 1, as the table below shows, the ACK/NACK feedback to a downlink transmission can only be sent on subframes number 2, 3, 7, and 8. Therefore the 8 ms round trip time that was mentioned for FDD, cannot be valid for this case.

TABLE 1

TDD Uplink-Downlink configurations

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

CSI Feedback

In order to utilize the variations in channel in the channel dependent scheduling, LTE UE must provide the radio base station with the channel state report. The channel state report is based on known reference symbols that are transmitted in the DL. The channel state report comprises one or several of the following information:

Rank indication (RI): RI is a recommendation to eNB, on how many layers in the downlink transmission must be used. The RI is only one value which means that the recommended rank is valid across the whole bandwidth Precoder matrix indication (PMI): PMI indicates the recommended precoder matrix that must be used in the downlink transmission. The recommended precoder matrix can be frequency-selective.

Channel quality indication (CQI): CQI shows the highest modulation and coding that can be used for DL transmission. CQI can be frequency-selective too, which means that multiple CQI reports can be sent for different parts of the bandwidth.

LTE network can request both periodic and aperiodic CSI reports. In LTE release 8/9 both periodic and aperiodic reports are based on Cell-specific Reference Signal (CRS), but in LTE release 10, the CSI report can also be based on CSI-RS which is used for transmission mode 9.

Positioning

Several positioning methods for determining the location of the target device, which can be any of the wireless device or UE, mobile relay, Personal Digital Assistant (FDA) etc exist. The position of the target device is determined by using one or more positioning measurements, which can be performed by a suitable measuring node or device. Depending upon the positioning the measuring node can either be the target device itself, a separate radio node, i.e. a stand-alone node, serving and/or neighboring node of the target device etc. Also depending upon the positioning method the measurements can be performed by one or more types of measuring nodes.

The well-known positioning methods are:

Satellite based methods: In this case the measurements performed by the target device on signals received from the navigational satellites are used for determining target device's location. For example either GNSS or A-GNSS, e.g. A-GPS, Galileo, COMPASS, GANSS etc, measurements are used for determining the UE position Observed Time Difference Of Arrival (OTDOA): This method uses UE measurement related to time difference of arrival of signals from radio nodes, e.g. UE Reference Signal Time Difference (RSTD) measurement, for determining UE position in LTE or Single Frequency Network (SFN)-SFN type 2 in HSPA.

Uplink Time Difference Of Arrival (UTDOA): It uses measurements done at a measuring node, e.g. Location Measurement Unit (LMU), on signals transmitted by a UE. The LMU measurement is used for determining the UE position.

Enhanced cell ID (E-CID): It uses one or more of measurements for determining the UE position e.g. any combination of UE Rx-Tx time difference, BS Rx-Tx time difference, timing advanced (TA) measured by the radio base station, LTE RSRP/RSRQ, HSPA CPICH measurements, CPICH RSCP/Ec/No, Angle of Arrival (AoA) measured by the radio base station on UE transmitted signals etc for determining UE position. The Time Advance measurement is done using use either UE Rx-Tx time difference or BS Rx-Tx time difference or both.

Hybrid methods: It relies on measurements obtained using more than one positioning method for determining the UE position In LTE the positioning node, a.k.a. Evolved Serving Mobile Location Centre (E-SMLC) or location server, configures the UE, radio base station or LMU to perform one or more positioning measurements depending upon the positioning method. The positioning measurements are used by the UE or by a measuring node or by the positioning node to determine the UE location. In LTE the positioning node communicates with UE using LTE Positioning Protocol (LPP) protocol and with radio base station using LTE Positioning Protocol annex (LPPa) protocol.

Device-to-Device (D2D) Communication

D2D communication enables direct communication between devices e.g. between pair or group of UEs. The D2D communication can be managed by a radio network node or can be done autonomously by the UEs involved in D2D communication. In the former case the D2D UEs maintain a communication link also with the radio network node for control, resource assignment etc. The D2D communication can share the spectrum or frequency band used for cellular communication between UE and radio network node or can use a dedicated spectrum or band.

There are several motivations for introducing the possibility for direct D2D communication as opposed to requiring devices to communicate via an infrastructure node, such as a cellular base station or a wireless access point.

The D2D UE performs the radio measurements, e.g. RSRP, RSRQ, UE Rx-Tx time difference etc, like normal UE on signals transmitted to and/or received from the radio network node. In addition the D2D UE also performs the radio measurements on signals transmitted to and/or received from the other D2D UE with which it communicates. These D2D specific measurements are also similar to SINR, SNR, Block Error Ratio (BLER), RSRP, RSRQ, UE Rx-Tx time difference etc.

Measurements performed at a user equipment or a base station may sometimes be inaccurate due to interferences from a different technology used within the device and may degrade the performance of the communications network.

SUMMARY

An object of embodiments herein is to provide a mechanism that improves the accuracy of measurements performed in a communications network.

According to an aspect the object is achieved by a method in a user equipment for performing a radio measurement in a communications network. The user equipment is In Device Coexistent, IDC, capable and is served by a network node in the communications network. The user equipment receives, from the network node, an IDC configuration for at least one IDC scheme. The user equipment further performs a radio measurement which meets one or more requirements related to the radio measurement provided the received IDC configuration meets a certain condition.

According to another aspect the object is achieved by a method in a network node for enabling a user equipment to perform a radio measurement in a communications network. The user equipment is IDC capable and is served by the network node in the communications network. The network node configures the user equipment with an IDC configuration for at least one IDC scheme. The IDC configuration enables the user equipment to perform a radio measurement which meets one or more requirements related to the radio measurement provided the IDC configuration meets a certain condition.

According to yet another aspect the object is achieved by a user equipment adapted for performing a radio measurement in a communications network. The user equipment is IDC capable and is configured to be served by a network node in the communications network. The user equipment comprises a receiver configured to receive, from the network node, an IDC configuration for at least one IDC scheme. The user equipment further comprises a performing circuit configured to perform a radio measurement which meets one or more requirements related to the radio measurement provided the received IDC configuration meets a certain condition.

According to still another aspect the object is achieved by a network node adapted for enabling a user equipment to perform a radio measurement in a communications network. The user equipment is IDC capable and the network node is configured to serve the user equipment in the communications network. The network node comprises a configuring circuit adapted to configure the user equipment with an IDC configuration for at least one IDC scheme. The IDC configuration enables the user equipment to perform a radio measurement which meets one or more requirements related to the radio measurement provided the IDC configuration meets a certain condition.

In that the user equipment performs a radio measurement which meets one or more requirements related to the radio measurement provided the IDC configuration meets a certain condition, this improves the accuracy of measurements performed in a communications network.

BRIEF DESCRIPTION OF THE DRAWINGS

Embodiments will now be described in more detail in relation to the enclosed drawings, in which.

DETAILED DESCRIPTION

Figure 1:
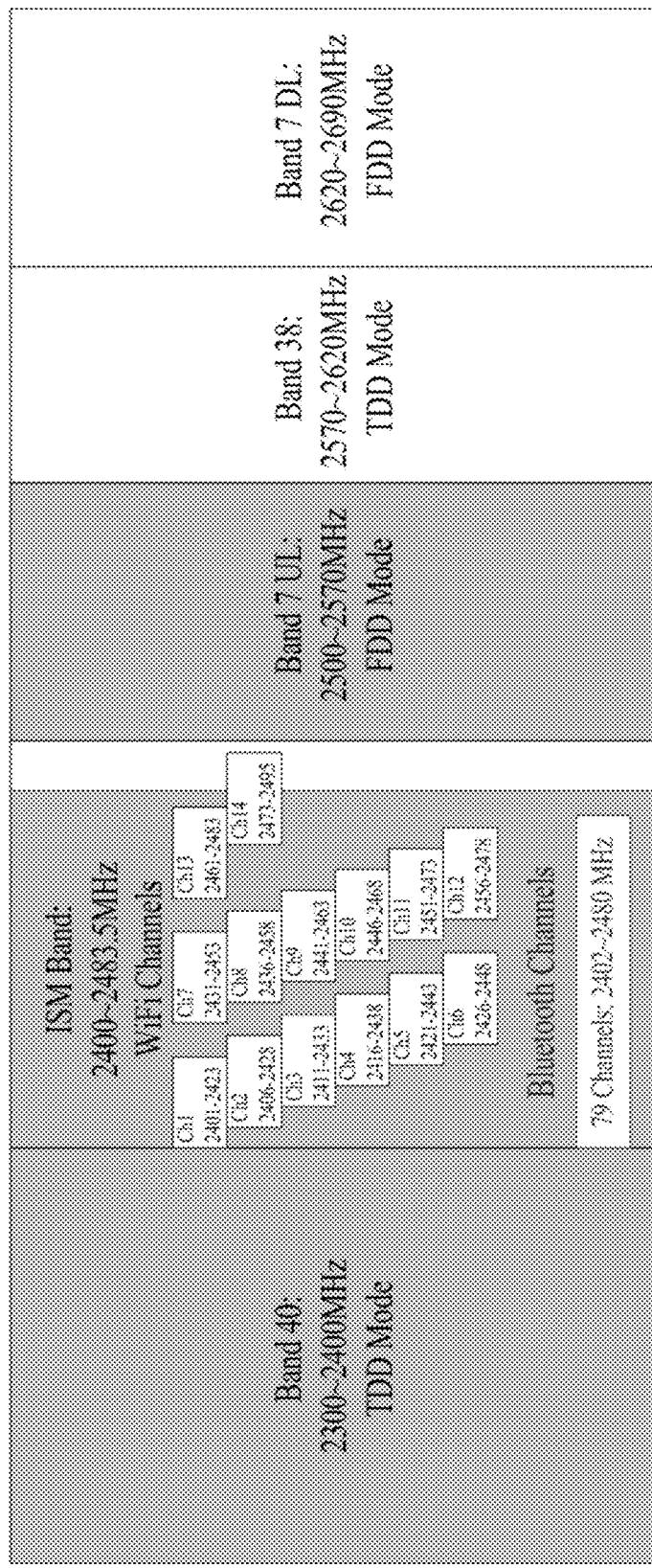
FIG. 1 shows 3GPP frequency bands around ISM band.
Figure 2:
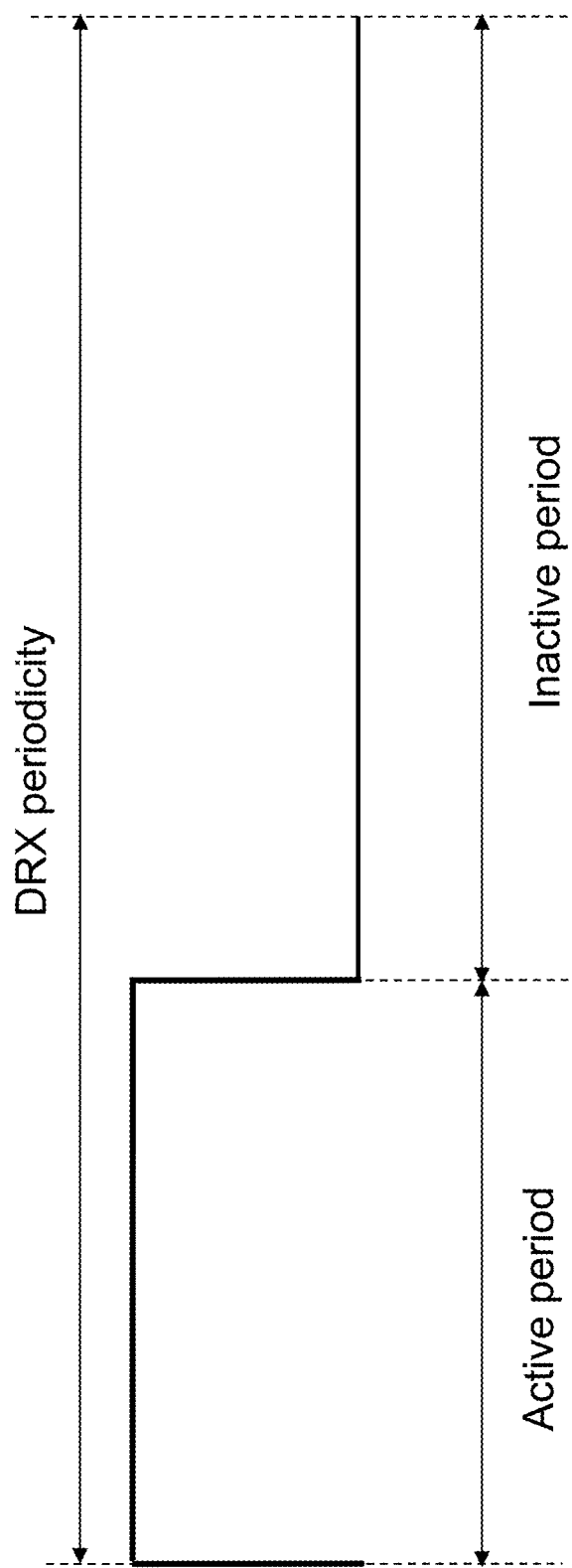
FIG. 2 shows DRX pattern for IDC interference avoidance.
Figure 3:
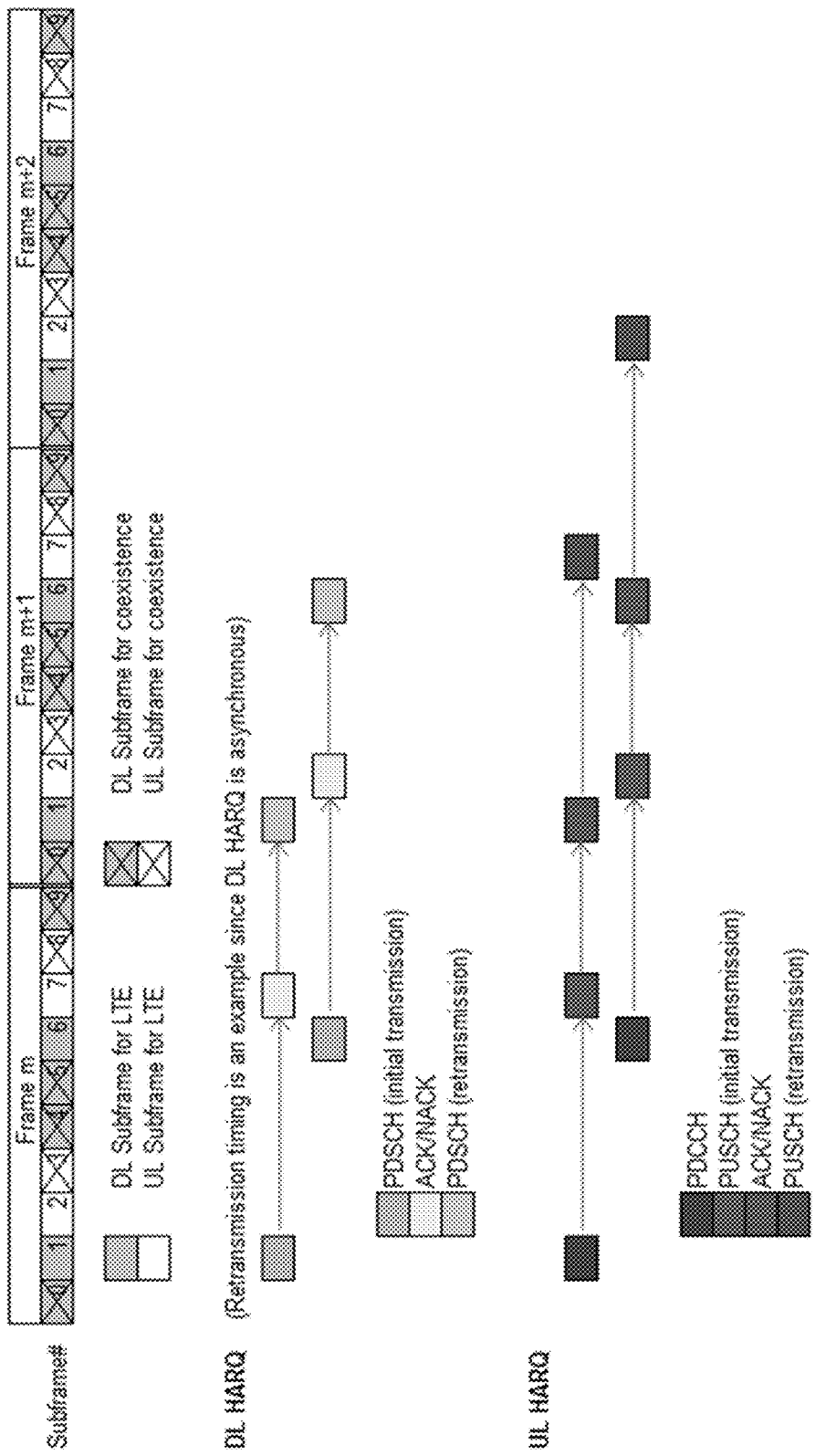
FIG. 3 is an illustration of HARQ process reservation.
Figure 4:
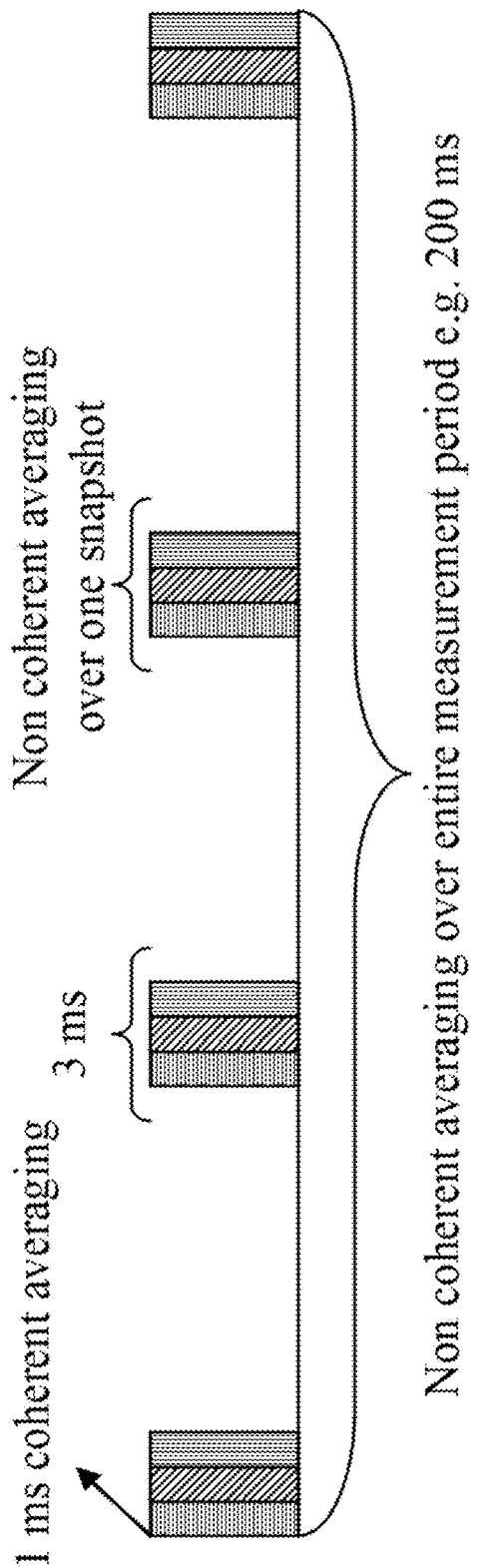
FIG. 4 shows an example of RSRP measurement averaging in E-UTRAN.
Figure 5:
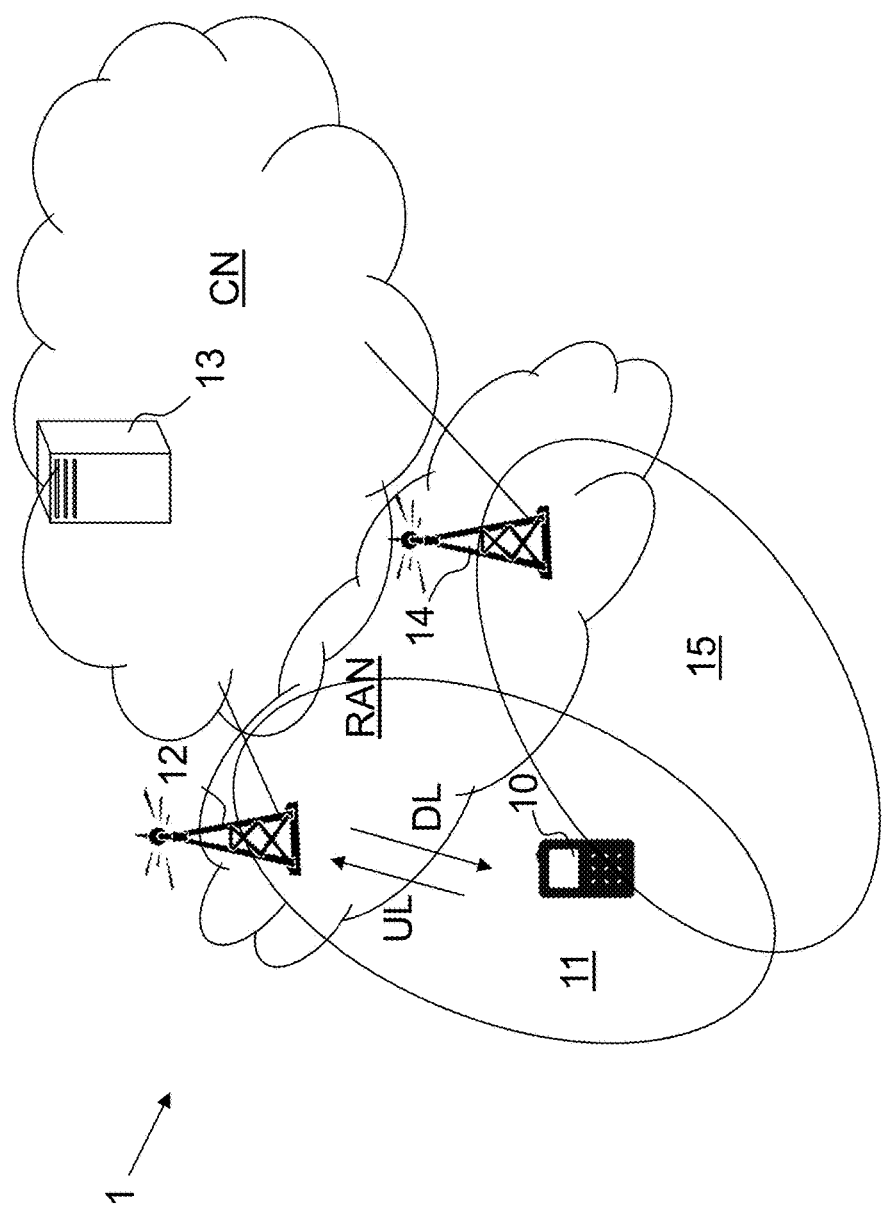
FIG. 5 is a schematic overview depicting a radio communications network according to embodiments herein.

FIG. 5 is a schematic overview depicting a communications network 1, e.g. a radio communications network. The communications network 1 comprises one or more RANs and one or more CNs and may use a number of different technologies, such as LTE, LTE-Advanced, Wideband Code Division Multiple Access (WCDMA), (GSM/EDGE), Worldwide Interoperability for Microwave Access (Wi-Max), or Ultra Mobile Broadband (UMB), just to mention a few possible implementations.

In the communications network 1, a user equipment 10, also known as a mobile station and/or a wireless terminal, communicates via a Radio Access Network (RAN) to one or more core networks (CN). It should be understood by the skilled in the art that "user equipment" is a non-limiting term which means any wireless terminal, Machine Type Communication (MTC) device or node e.g. Personal Digital Assistant (PDA), laptop, mobile, sensor, relay, mobile tablets or even a small base station communicating within a cell.

The communications network 1 covers a geographical area which is divided into cell areas, e.g. a cell 11 being served by a radio base station 12. The radio base station 12 may also be referred to as a first radio base station, a NodeB, an evolved Node B (eNB, eNodeB), a base transceiver station, Access Point Base Station, base station router, or any other network unit capable of communicating with a user equipment within the cell served by the radio base station depending e.g. on the radio access technology and terminology used. The radio base station 12 may serve one or more cells, such as the cell 11.

A cell is a geographical area where radio coverage is provided by radio base station equipment at a base station site. The cell definition may also incorporate frequency bands and radio access technology used for transmissions, which means that two different cells may cover the same geographical area but using different frequency bands. Each cell is identified by an identity within the local radio area, which is broadcast in the cell. Another identity identifying the cell 11 uniquely in the whole communications network 1 is also broadcasted in the cell 11. The radio base station 12 communicates over the air or radio interface operating on radio frequencies with the user equipment 10 within range of the radio base station 12. The user equipment 10 transmits data over a radio interface to the radio base station 12 in UL transmissions and the radio base station 12 transmits data over the radio interface to the user equipment 10 in Downlink (DL) transmissions.

Furthermore, the communications network 1 comprises a core network node such as a Positioning node 13 for enabling positioning of the user equipment 10 or position related services. Another, a different, or second, radio base station 14 is also comprised in the communications network 1. The second radio base station 14 provides radio coverage over a second cell 15, another or a different cell, e.g. a cell neighboring to the cell 11. The radio base stations 12,14 and the positioning node 13 are all examples of a network node. Other examples of a network node are a Self-Organizing Network (SON) node, a Minimization of Drive Tests (MDT) node or similar.

In some versions of the communications network 1, e.g. in UMTS, several base stations are typically connected, e.g. by landlines or microwave, to a controller node (not shown), such as a Radio Network Controller (RNC) or a Base Station Controller (BSC), which supervises and coordinates various activities of the plural base stations connected thereto. The RNCs are typically connected to one or more core networks. However, embodiments herein are exemplified in an LTE network.

According to embodiments herein the user equipment 10 is In Device Coexistence (IDC) capable, i.e. configured to avoid interference between transmission and reception of different technologies in the user equipment 10. When using interference avoidance solutions, different measurements as described above, must satisfy the measurement accuracies for the non-IDC case. In other words, an interference avoidance solution must be transparent to the measurements.

As explained earlier, when an interference avoidance solution is used, some UL or DL subframes may be skipped by the user equipment 10. This can cause a lower accuracy since measurements are based on a set of the received symbols. This may result in performance degradation and may also cause measurement failure. In that the user equipment 10 is IDC capable means that the user equipment 10 deals with the transmission (TX) and reception (RX) of signals to and from one radio technology, such that it causes little or no interference to other radio technologies in the same device, i.e. the user equipment 10. Some IDC interference mitigation methods require interrupting UL and/or DL operation in the user equipment 10 in one radio technology, to protect transceiver that is operating in the other radio technology. This can have an impact on the measurements that the user equipment 10 or the network node are doing regularly. This in turn may degrade performance of the communications network 1 since measurements are used for various actions e.g. mobility, positioning etc. However, embodiments herein suggest methods and apparatuses to ensure that the measurements under IDC scenario are performed adequately.

Embodiments herein disclose methods to ensure that the user equipment and/or a network node, exemplified herein as the radio base station 12 or the positioning node 13, may perform measurements that meet requirements when certain rules or conditions are met. The methods comprise pre-defined rules and/or pre-defined requirements. These rules and/or requirements may also be applicable to the user equipment 10, which e.g. supports certain frequency bands e.g. band 40, band 7 etc.

Examples of requirements, a.k.a. measurement requirements, performance requirements etc., related to radio measurements are: cell identification delay, CGI reporting delay, measurement period, measurement reporting delay, measurement reporting time, UE transmit timing accuracy, measurement accuracy, evaluation period of out of sync in RLM, evaluation period of in sync in RLM, UE transmit timing accuracy etc.

The requirements are also interchangeably called as performance figures or performance requirements or measurement requirements etc. The requirements depend upon the type of measurement, procedure, e.g. handover, positioning, etc.

In order to meet any of the pre-defined requirements, the user equipment 10 may have to adapt to one or more radio operations or procedures, e.g. adaption of measurement sampling, adaptation of autonomous denial subframes etc. A UE not adapting the radio operations may not meet the pre-defined requirements which are verified by conformance testing. Hence, these measurements are not reliable and the performance of the communications network 1 would be reduced. However, according to embodiments herein the network node, e.g. the radio base station 12 the positioning node 13, configures the user equipment 10 with an IDC configuration for at least one IDC scheme, e.g. with an IDC subframe pattern, autonomous denial parameters or similar. The IDC configuration enables the user equipment 10 to perform a radio measurement which meets one or more requirements related to the radio measurement provided the IDC configuration meets a certain condition. Thus, the user equipment 10 receives, from the network node, the IDC configuration for the at least one IDC scheme. The user equipment 10 then performs a radio measurement which meets one or more requirements related to the radio measurement provided the received IDC configuration meets a certain condition. By configuring the user equipment 10 with an IDC configuration that meets the certain condition, such as "less than X denial subframes over a Transmission Time Interval (TTI)", and only then the radio measurement may meet the requirement, ensures that the measurement is reliable.

Figure 6:
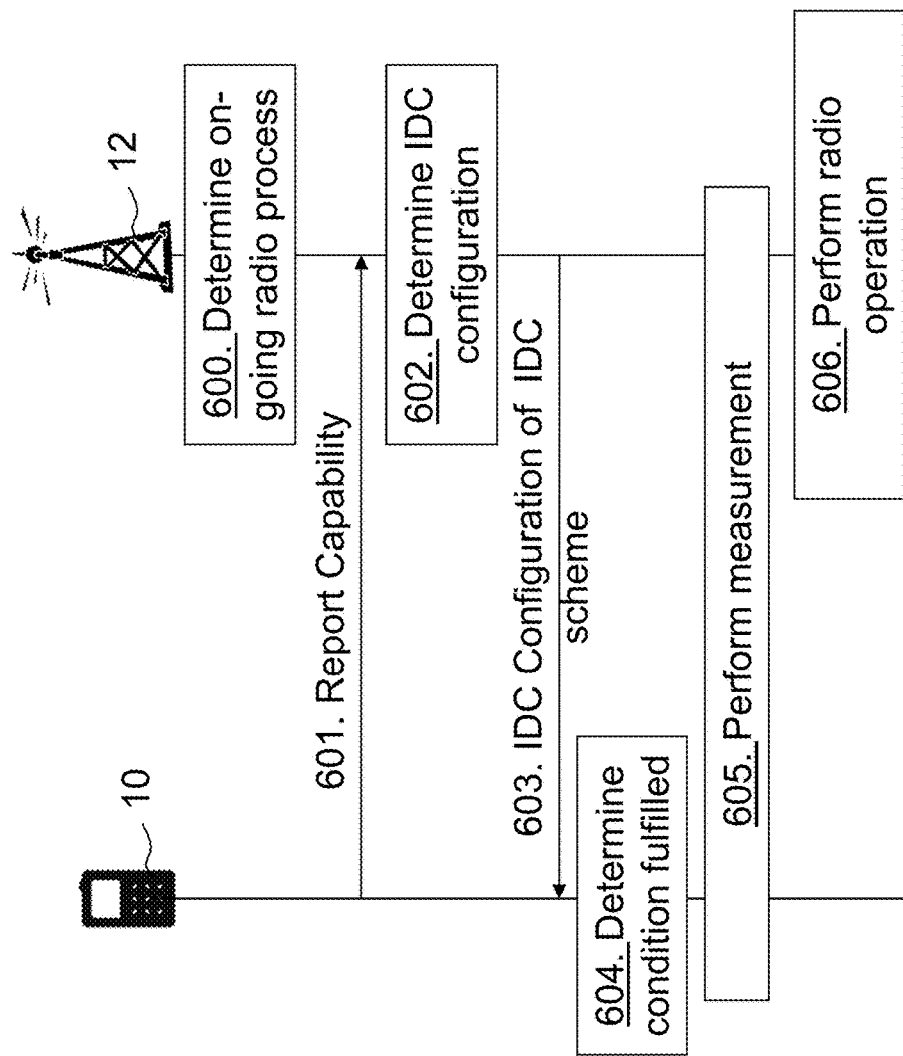
FIG. 6 is a combined flow chart and signalling scheme depicting embodiments herein.

FIG. 6 is a schematic combined flow chart and signalling scheme depicting some embodiments herein for performing a radio measurement in the communications network 1. The user equipment 10 is capable of IDC handling and is served by the network node, exemplified in the FIG. 6 as the radio base station 12, in the communications network 1. The actions do not have to be taken in the order stated below, but may be taken in any suitable order.

Action 600.

The radio base station 12 may determine on-going radio processes or radio processes that are expected to start, which radio processes are associated with the user equipment 10.

Action 601.

The user equipment 10 may report its capability to handle IDC to the radio base station 12. The capability indicates that the user equipment 10 is capable of performing a radio measurement which meets one or more requirements related to the radio measurement provided the IDC configuration meets a certain condition. According to some embodiments the user equipment 10 indicates or provides relevant capability information to the radio base station 12 to inform the radio base station 12 whether the user equipment 10 is capable of adapting one or more radio procedures, meeting pre-defined rules and pre-defined requirements when it is configured with one or more IDC scenario disclosed in preceding sections.

The capability information sent to the radio base station 12 may also contain additional or specific information e.g.:

information indicating whether the user equipment 10 is capable of adapting one or more radio procedures and/or meeting rules and requirements disclosed above only in specific IDC scenarios, e.g. when certain external wireless system is GNSS co-existing with cellular;

information indicating whether the user equipment 10 is capable of adapting one or more radio procedures and/or meeting rules and requirements disclosed above only for certain frequency bands e.g. LTE band 40, LTE band 7 etc.;

information indicating whether the user equipment 10 is capable of adapting one or more radio procedures and/or meeting rules and requirements disclosed above only for specific IDC solution e.g. autonomous denial, HARQ process reservation based solution, DRX based solution etc;

information indicating whether the user equipment 10 is capable of adapting one or more radio procedures and/or meeting rules and requirements disclosed in preceding section also when in D2D communication mode; Indicating whether the user equipment 10 is capable of adapting one or more radio procedures and/or meeting rules and requirements disclosed in preceding section only when operating in single carrier mode;

information indicating whether the user equipment 10 is capable of adapting one or more radio procedures and/or meeting rules and requirements disclosed above only when operating in single carrier mode;

information indicating whether the user equipment 10 is capable of adapting one or more radio procedures and/or meeting rules and requirements disclosed above also when operating in multi-carrier operational mode. It may also indicate whether it can adapt one or more procedures for UL and/or DL multi-carrier operation. Yet certain UEs may also indicate that they are only capable of adapting one or more radio procedures and/or meeting rules and requirements disclosed above in certain type of multi-carrier operation e.g. intra-band contiguous Carrier Aggregation (CA), inter-band CA, intra-band non-contiguous CA etc.

The user equipment 10 may send the capability information, i.e. related to the supported scheme, to the radio base station 12 in any of the following manner:

proactive reporting without receiving any explicit request from radio base station 12 being e.g. serving network node or any target network node such as the second radio base station 14;

reporting upon receiving any explicit request from the radio base station 12 being e.g. serving network node or any target network node such as the second radio base station 14. The explicit request may be sent to the user equipment 10 by the network anytime or at any specific occasion. For example the request for the capability reporting may be sent to the user equipment 10 during initial setup or after a cell change, e.g. handover, RRC connection re-establishment, RRC connection release with redirection, PCell change in CA, Primary Component Carrier (PCC) change in PCC etc.

In case of proactive reporting the user equipment 10 may report its capability during one or more of the following occasions: During initial setup or call setup e.g. when establishing the RRC connection; During cell change e.g. handover, primary carrier change in multi-carrier operation, PCell change in multi-carrier operation, RRC re-establishment, RRC connection release with redirection etc.

Action 602.

The radio base station 12 determines IDC configuration for the user equipment 10 based on for example the received capability. Thus, the IDC configuration may be based on the received capability. The radio base station 12 may determine the IDC configuration according to a rule that will ensure consistent user equipment behaviour and/or will ensure that the user equipment 10 meets one or more requirements related to the radio measurement.

Action 603.

The radio base station 12 configures the user equipment 10 with the IDC configuration for at least one IDC scheme, which IDC configuration, as determined above, enables the user equipment 10 to perform a radio measurement which meets one or more requirements related to the radio measurement provided the IDC configuration meets the certain condition. Thus, the user equipment 10 receives, from the radio base station 12 or another network node, the IDC configuration for at least one IDC scheme. As exemplified, the radio base station 12 may transmit the IDC configuration for at least one IDC scheme to the user equipment 10.

Action 604.

The user equipment 10 may determine that the received IDC configuration meets the certain condition. E.g. that the number of denial subframes does not exceed a preset number of denial subframes within a certain time interval.

Action 605.

The user equipment 10 may then perform a radio measurement which meets one or more requirements related to the radio measurement provided the received IDC configuration meets the certain condition.

As mentioned earlier both the user equipment 10 and the radio base station 12 are doing radio measurements regularly and based on multiple received samples in time. When the user equipment 10 denies some sub-frames autonomously, the radio measurement may be done based on a smaller number of samples. The radio measurement has to meet certain pre-defined requirement such as measurement accuracy over the measurement period a.k.a. physical layer (L1) measurement period. For example RSRP is a measurement over 200 ms in non-DRX and is required to meet certain measurement accuracy e.g. ±6 dB with 90%-ile confidence interval. This means that due to inadequate number of samples due to puncturing of certain subframes or time instances the accuracy of the ongoing measurement cannot be guaranteed. Note that the denial can be on both DL and UL subframes, which impacts measurements at the user equipment 10 and the radio base station 12, respectively. This also affects the user equipment 10 and/or radio network node measurements which are done on transmitted signals. For example BS Rx-Tx time difference is measured on base station transmitted and user equipment transmitted signals. Therefore in subframes or time instances in which the user equipment 10 does not transmit due to autonomous denials the radio base station 12 cannot perform BS Rx-Tx time difference measurement.

Several examples of pre-defined rules and/or requirements are provided below. The user equipment 10 and/or the radio base station 12 depending upon the rule/requirements may be required to meet one or more of them.

For example it may be pre-defined that the user equipment 10 shall meet one or more requirements related to measurements provided certain conditions are met. Examples of conditions are: Values of parameters related to a particular "interference avoidance solution" e.g. DRX based solution, HARQ process reservation based solution, UE autonomous solution based on denials etc. Examples of requirements as mentioned earlier are measurement period, evaluation periods used in RLM, out of sync and in sync in DRX and in non DRX etc. For example it may be pre-defined that requirements shall be met when the user equipment 10 is configured by the network with an IDC configuration using certain range of parameters e.g. when autonomous denial related parameter, "autonomousDenialSubframes" is not larger than 20 ms, and/or when autonomous denial related parameter, "autonomousDenialValidity" is not larger than 1 second; or when autonomous denial related parameter, "autonomousDenialSubframes" is up to full range, e.g. 30 ms, or any value; and/or when autonomous denial related parameter, "autonomousDenialValidity" is up to full range, e.g. 2 s, or any value. More specifically it may be pre-defined that the user equipment 10 shall meet one or more requirements provided the user equipment 10 is configured by the network with an IDC configuration comprising of autonomousDenialSubframes not larger than certain value, e.g. 20 ms, over certain autonomousDenialValidity duration, e.g. 1 second.

In yet another specific example it may be pre-defined that requirements, e.g. evaluation periods used in RLM out of sync and in sync in DRX and in non DRX etc, shall be met by the user equipment 10 when the user equipment 10 is configured by the network with certain IDC subframe pattern, e.g. used for "HARQ process reservation based solution", or using certain range of parameters e.g. IDC subframe pattern configured by the network comprises at least certain subframes per time period, e.g. per frame, are available for usage by the user equipment 10 for E-UTRAN e.g. certain number of '1' in every frame in an IDC pattern; IDC subframe pattern configured by the network comprises at least one subframe per per radio frame, are available for E-UTRAN usage by the user equipment 10 or in other words in at least one out of ten subframes the E-UTRAN is not required to abstain from using the subframe. Example of such pattern is: [1000000000, 1000000000, 1000000000, 1000000000].

In some further embodiments it may be pre-defined that second set of requirements shall be met by the user equipment 10 when the user equipment 10 is configured by the network, e.g. the radio base station 12, with a certain IDC related scheme otherwise the user equipment 10 shall meet the first set of requirements. The second set of requirements is more relaxed than the first set of requirements. For example the second set of requirements can be characterized with a longer measurement period than that used in first set of requirements e.g. second and first set may use 400 ms and 200 ms of measurement period respectively. For example it may be pre-defined that the user equipment 10 shall perform a certain measurement, e.g. RLM out of sync and/or in-sync, also when configured with one or more IDC scheme, e.g. with an IDC subframe pattern, autonomous denial parameters etc, however in this case the measurement period, e.g. out of sync and/or in sync RLM evaluation periods, of the said measurement may be extended compared to the case when IDC is not configured.

In another example the measurement period may be the same, i.e. 200 ms, as without IDC gaps but another one or more pre-defined requirements can be relaxed; for instance the number of identified cells, i.e. no of RSRP/RSRQ measurements, required to be measured by the user equipment 10 is reduced e.g. from 8 cells to 6 cells. The exact reduction of cells can be governed by an expression which is a function of the active or available time when the UE receiver is guaranteed to be active for doing measurement. This is because the available radio time for the user equipment 10 to do the measurement is reduced proportional to the time of the IDC gaps, i.e. idle time created by one or more TDM solution e.g. autonomous denial, HARQ process reservation based solution etc.

The rule may be applicable only for certain measurements and/or for certain pre-defined requirements or for all.

For example it may be pre-defined that the second set of requirements shall be met by the user equipment 10 under certain conditions e.g. when the user equipment 10 is configured by the network with:

IDC subframe pattern, e.g. used for "HARQ process reservation based solution", and/or with autonomous denial parameters, e.g. autonomousDenialValidity, autonomousDenialSubframes etc.

More specifically it may be pre-defined that the second set of requirements, or certain set of requirements, shall be met by the user equipment 10 when the user equipment 10 is configured by the network with:

certain pattern of the IDC subframe pattern, e.g. used for "HARQ process reservation based solution", e.g. 2 subframe every 20 ms available for LTE operation. and/or with certain parameter values associated with autonomous denial parameters, e.g. autonomousDenialValidity >1 second, autonomousDenialSubframes >20 ms etc.

According to another example of embodiments one or more rules are pre-defined to set the priority between measurement gaps used by the user equipment 10 for performing a radio measurement and gaps created due to IDC operation, e.g. HARQ process reservation based solution, autonomous denial etc, when both are simultaneously configured or used by the user equipment 10. The problem may arise especially if the type types of gaps overlap partially or fully. The measurement gaps can be network configured gaps and/or the measurement gaps can be UE autonomous gaps, e.g. for reading CGI of a cell. The pre-defined rules will ensure consistent UE behavior and will enable network to know the expected results from the user equipment 10 according to the rule and if necessary enable network to take necessary action.

Few specific examples are provided below:

In one example a pre-defined rule specifies that when the user equipment is configured by the network with one or more IDC related schemes and when the user equipment 10 is also requested to perform a measurement using measurement gap then the user equipment 10 shall prioritize the gaps or idle time created for the IDC over the measurement gaps, i.e. overrides the gaps or idle time created for the IDC over the measurement gaps. That means in this case the user equipment 10 will not perform measurement during gaps and instead creates gaps for IDC to avoid interference towards the in-device external wireless system. It may also be specified that gaps or idle time created for the IDC are prioritized by the user equipment 10 only when they partly or fully overlap with the measurement gaps.

In a second example, which is opposite to the previous one, a pre-defined rule specifies that when the user equipment 10 is configured by the network with one or more IDC related schemes and when the user equipment 10 is also requested to perform a measurement using measurement gap then the user equipment 10 shall prioritize the measurement gaps over the gaps or idle time created for the IDC, i.e. overrides the measurement gaps over the gaps or idle time created for the IDC. That means in this case the user equipment 10 will perform measurement during measurement gaps and will not create idle gaps for IDC to avoid interference towards the in-device external wireless system. It may also be specified that measurement gaps are prioritized by the user equipment 10 only when the measurement gaps partly or fully overlap with the gaps or idle time created for the IDC.

It may also be pre-defined that the user equipment 10 shall meet the requirements related to measurements performed in measurement gaps, e.g. network configured gaps, autonomous gaps etc, provided the measurement gaps do not overlap with idle time or gaps created due to IDC configuration, e.g. IDC subframe pattern, autonomous denial configurations etc. Examples of measurements done in gaps are inter-frequency, inter-RAT etc. In order to meet this condition the radio base station 12 configuring measurement gaps or configuring a measurement which requires gaps, e.g. cell's CGI acquisition, will be required to configure the measurement(s) which need gaps and the IDC such that measurement gaps don't overlap or collide with the idle time or gaps due to IDC. For example the radio base station 12 may either postpone the measurements which require gaps or it may postpone the IDC configuration. The decision determining which one to postpone depends upon the scenario. For example if an important measurement, e.g. measurement for handover due to risk of handover failure, positioning for emergency call etc, is required then the radio base station 12 may prioritize configuring measurements requiring gaps over the IDC.

In prior art the priority level between gaps or idle time created for the IDC and measurement gaps is not defined. This leads to inconsistent UE behavior and may result in both IDC interference and also failure of measurements in gaps. The radio base station 12 may also configure the user equipment 10 with both IDC scheme, i.e. allow gaps for IDC, and measurement gaps for measurements. This also increases signaling overheads, increases processing and complexity at the user equipment 10.

According to another embodiment a rule or condition may be pre-defined that when IDC gaps are created, e.g. when any of IDC schemes is configured, the user equipment 10 shall meet positioning measurement requirements provided the IDC gaps don't fully or at least partly overlap or collide with the reference signals on which positioning measurements are performed.

Examples of positioning measurements are OTDOA RSTD intra-frequency RSTD measurement, inter-frequency RSTD measurement etc. Yet another example is UL Time Difference of Arrival (UTDOA) measurements e.g. UL Relative Time of Arrival (RTOA). The corresponding requirements are RSTD measurement period, RSTD measurement accuracy, RTOA measurement period etc.

To enable RSTD measurements the Positioning Reference Signal (PRS) are configured with certain periodicity e.g. one PRS occasion can carry up to 7 DL subframes with PRS with certain PRS occasion periodicity, e.g. one occasion every 640 ms, 1280 ms etc.

Similarly for RTOA measurements done by the LMU, the user equipment is configured with Sounding Reference Signal (SRS) with a certain periodicity. For example if IDC scheme is configured in a way that the IDC gaps don't overlap with PRS then user equipment 10 shall meet the OTDOA RSTD requirements. In another example IDC gaps and PRS subframes partially overlap then the user equipment 10 also meets the RSTD requirements but only for the number of PRS subframes which are available for the RSTD measurements in a PRS occasion.

In order to ensure that the positioning measurements are performed successfully by the user equipment 10, the network, i.e. the network node, may ensure that one or more IDC scheme is configured with parameters, e.g. IDC subframe pattern, autonomous denial parameters etc, that the IDC gaps don't overlap or at least don't fully overlap with the reference signals used for positioning.

Action 606.

In some embodiments, the radio base station 12 performs one or more radio operation tasks or actions, such as type of measurement or similar, based on the received capability. The acquired capability information may be used by the radio base station 12 for performing one or more radio operation tasks or actions. The tasks comprise selection of a procedure, adapting a parameter in a configuration message related to measurement, scheduling, mobility etc. One example of radio operation task is the decision at the radio base station 12 whether to configure the user equipment 10 to perform certain type of measurement or not. For example depending upon the capability the radio base station 12 may select an alternative which is most suitable. For example if the user equipment 10 supports adaptation of procedures only under autonomous denial then the network will use this method and also configure the user equipment 10 to perform certain measurements. For other methods, e.g. HARQ based solution, the network may either not use it when critical measurements are to be performed by the user equipment 10 and/or by the radio base station 12. In yet another example the user equipment 10 may use this scheme, HARQ based solution, but it may not configure user equipment 10 to perform critical measurements e.g. used for positioning in emergency situation.

Figure 7:
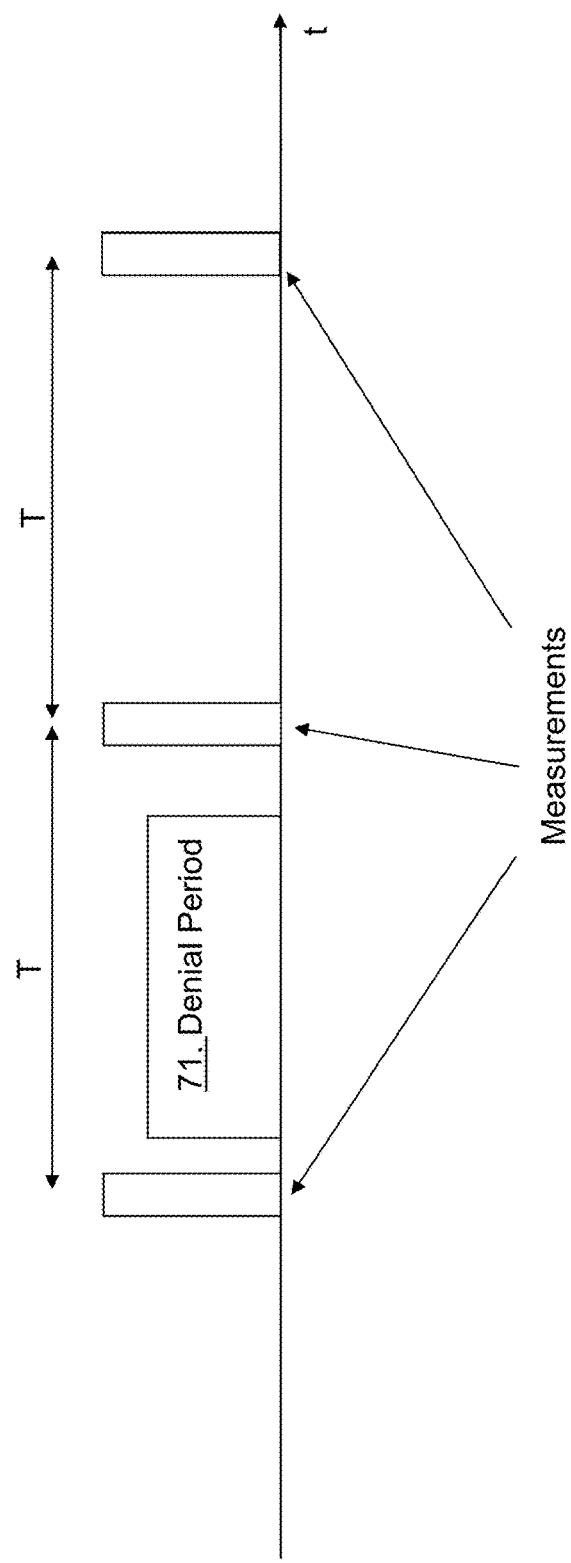
FIG. 7 illustrates autonomous denial between the measurement samples.

Autonomous denial can be applied by the user equipment 10 based on the parameters related to one or more radio measurements. For example the adaptation of the autonomous denial may depend upon parameters such as measurement period, number of measurement samples, measurement sampling rate, measurement sample size etc used for performing a radio measurement. If an autonomous denial subframe period 71 is smaller than measurement sampling period, the user equipment 10 can deny subframes in between the measurements instants as shown in FIG. 7. For example, assume the measurement sampling rate T comprises one 2 ms long measurement sample obtained by the user equipment 10 every 40 ms. Also assume that the required amount of total denials in terms of number of subframes is 30 subframes. Therefore the user equipment 10 may adapt the autonomous denial such that it does not coincide with the measurement sampling instances rather it falls within the successive measurement samples. This way the samples that are used for the measurements are saved and the accuracy of measurement is not impacted. This also ensures that the user equipment 10 can meet the measurement accuracy of the on-going measurement over the existing measurement period without extending the measurement period. Therefore performance of the measurement is not degraded and the corresponding function such as handover which relies on measurement is not degraded.

The user equipment 10 may adapt its autonomous denials thereby avoiding collision between autonomously denied subframes, i.e. gaps with no transmission and/or reception, with the measurement samples and thus avoiding deteriorating the measurement performance.

If the number of subframes that the user equipment 10 denies is larger than the measurement sampling period, the user equipment 10 may adjust the sampling to ensure measurement accuracy. Hence, some embodiments herein disclose adjusting sampling time for the measurements based on the denial subframe period. In the example shown in FIG. 8, a second sampling instant 81 is delayed, $T_1$, so that it occurs after the denial period 82 is over. Previously a UE performs sampling periodically i.e. samples are placed at equidistance in time. Therefore according to this embodiment the user equipment 10 will be required to obtain at least certain measurement samples aperiodically. For example if the denial period 82 is 30 ms but the measurement sampling rate is 1 sample every ms, then the user equipment 10 will not take any measurement sample which would overlap with the denial period 82 and instead will take one or more sample more frequently e.g. once every 10 ms, T2, after the denial period 82 is over. This type of adaptation of measurement sampling can be done either before or after the denial period 82.

Figure 9:
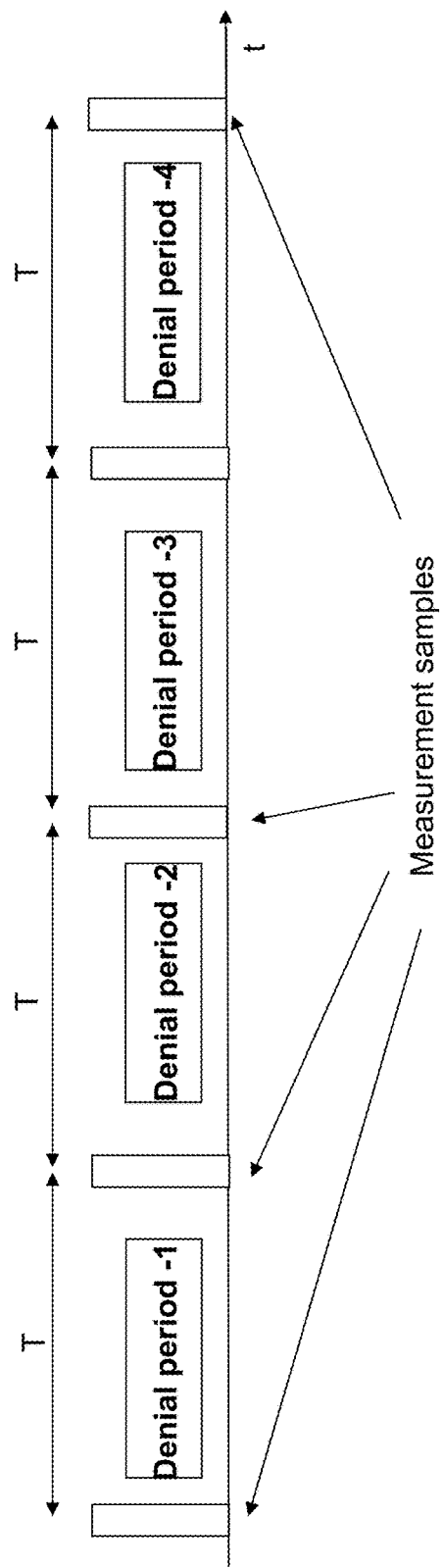
FIG. 9 shows a method of adjusting the denial period.

FIG. 9 discloses embodiments adjusting the denial period without affecting the sampling time T of the measurements in case the aggregated denial period is larger than the time between the successive measurement sampling instances. This is particularly useful in case the aggregated denial period is much larger than the sampling period. In this case if the user equipment 10 follows the method described in previous embodiment the user equipment 10 might be required to perform adjustment of several samples. To elaborate this embodiment consider that the total required denial period is 20 ms whereas the measurement sampling period is 10 ms e.g. 1 ms sample is taken once every 10 ms. Using this embodiment the user equipment 10 may split its denial period into 4 groups, Denial period-1-Denial period-4, each of a time interval T of 5 ms and create each one of them between the successive measurement samples. This is illustrated in FIG. 9.

Figure 8:
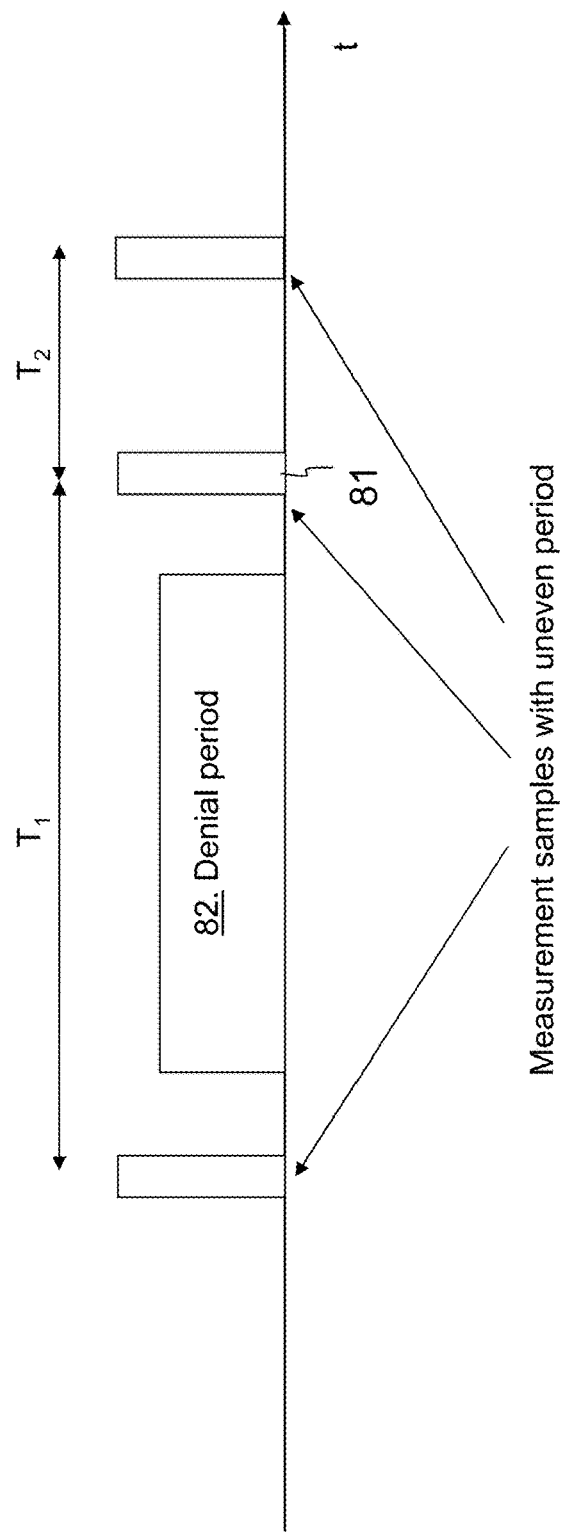
FIG. 8 illustrates the adjusting of the measurement instants to the denial.
Figure 10:
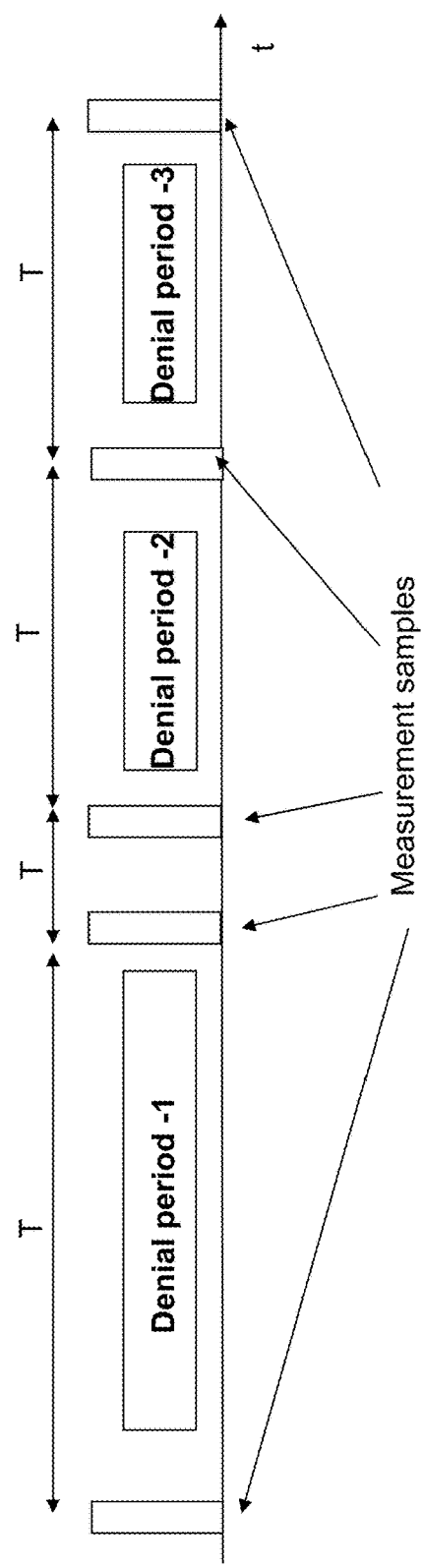
FIG. 10 shows a method of combination of adjusting the measurement sampling and denial period.

According to yet another aspect of embodiments herein the user equipment may also apply the combination of the methods of adjusting the sampling time period, i.e. shown in FIG. 8, and the method of adjusting the denial period, shown in FIG. 9. The method of combining adjustments of measurement sampling and denial period is shown in FIG. 10. For example the user equipment 10 may split the total denial subframes into 3 groups, Denial period-1-Denial period-3: one of 10 ms which will require the user equipment 10 to adjust the measurement sample and the remaining two each of 5 ms which can be placed between successive measurement samples.

After performing one or more measurement according to any of the adaption scheme described the user equipment 10 will use the performed measurements for one or more radio operational tasks; examples of such tasks are cell selection, cell reselection, reporting measurement results to the network node which may use it for mobility, positioning etc. The user equipment 10 may also additionally report to the network that it has adapted or adjusted any of the denial time, measurement sampling rate or combination thereof.

Examples of radio operations at the network node which can be adapted are scheduling of data, performing measurements, sending measurement request etc. As an example, if the maximum number of denials in the validity period is consumed, then the network node or D2D UE can schedule the user equipment 10, i.e. UE1 in case of D2D UE, for the remaining part of the validity without worrying about any subframe denial. Also if a large number of denials are used in a period, then the network node can schedule more aggressively for the remaining part of the validity range e.g. continuously if there is more data to send to the user equipment 10.

Figure 11:
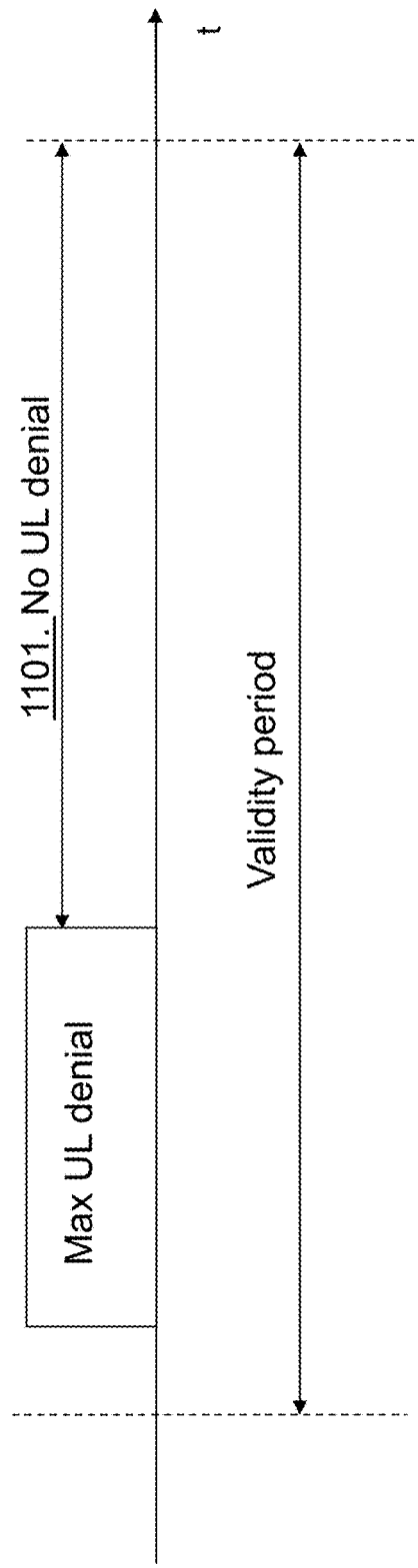
FIG. 11 shows an example of adapting scheduling to IDC signal.

In yet another example a radio measurement can be done over the entire remaining period 1101 of the validity period as shown in FIG. 11. For example measurement period may have to be extended if measurement is done in the initial 200 ms, but no extension is required if done in remaining 800 ms.

In the preceding sections the methods related to adaption of one or more procedures, e.g. measurement sampling, IDC configuration etc, in an IDC scenario are described for the UE autonomous denial. The UE autonomous denial is one of the TDM schemes used in IDC scenario, i.e. when a cellular system, e.g. LTE band 40, and external wireless system, e.g. ISM band, co-exist on the same wireless device. However in principle the methods disclosed in preceding disclosure are applicable to any type of TDM scheme in which the user equipment does not operate, receive and/or transmit, in certain subframes for cellular communication and instead use that time for external wireless systems, e.g. GPS, WLAN etc. For example in other TDM scheme related to IDC scenario such as in "HARQ process reservation based solution" a number of LTE HARQ processes or subframes are reserved for LTE operation and the remaining subframes are used to accommodate the external wireless system, e.g. ISM/GNSS traffic. The actual number of subframes available for LTE operation and subframes available for the external wireless system operation are allocated by the network. More specifically the "HARQ process reservation based solution" is realized by the network by configuring a pattern of subframes called, "IDC subframe pattern" defined in TS 36.331 Rel-11, v. 11.1.0 sections 5.6.9 and 6.2.1. It defines the subframes for external wireless system and for LTE usage. The pattern is e.g. of 40 ms for FDD and 70, 10 and 60 ms for LTE TDD. In other words the user equipment 10 may have limited subframes for transmission and/or reception of LTE signals. Therefore when network uses HARQ process reservation based solution the user equipment 10 and/or the network node, which may also cover a D2D UE, may also adapt the radio procedures according to the rules described above. This in turn will enable the user equipment 10 and the network node to meet the pre-defined requirements and ensure good performance when IDC scenario is operational. The methods also apply to DRX based solution used in IDC scenario.

Method of Avoiding IDC Gaps During Critical Instances

In certain critical scenarios the network node may not configure IDC scheme and/or the user equipment 10 may not send IDC request to the network and/or the user equipment 10 may not create IDC gaps if the user equipment 10 is configured with any of the IDC scheme, e.g. IDC subframe pattern, autonomous denial parameters etc. Thus, avoiding IDC gaps during critical instances. For example the user equipment 10 may wait sending request or applying the IDC gaps until the critical scenario or condition is over. Examples of critical scenarios are:

- when user equipment 10 is scheduled to receive and/or transmit with a high priority data, services, delay stringent service (e.g. VOIP) etc.
- when the user equipment 10 is in critical state e.g. on-going emergency calls, emergency positioning session etc.

The critical scenarios in which the IDC gaps are not created or IDC scheme is not configured can either be pre-defined and/or can be informed by the network to the user equipment 10.

Figure 12:
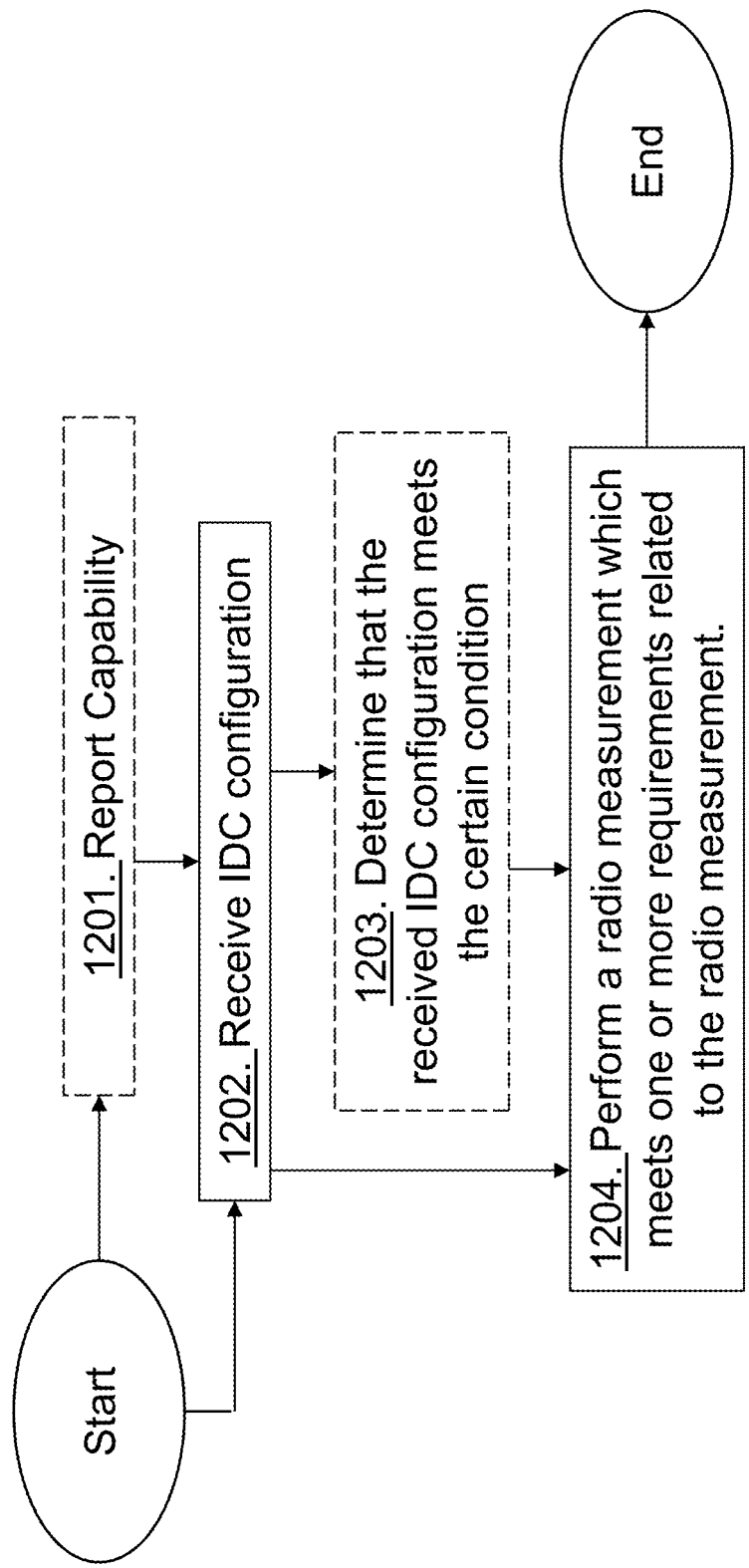
FIG. 12 is a schematic flow chart depicting a method in a user equipment according to embodiments herein.

The method actions in the user equipment 10 for performing a radio measurement in the communications network according to some embodiments will now be described with reference to a flowchart depicted in FIG. 12. The actions do not have to be taken in the order stated below, but may be taken in any suitable order. Actions performed in some embodiments are marked with dashed boxes.

Action 1201.

The user equipment 10 may report capability of the user equipment 10 to the network node 10. The capability indicates that the user equipment 10 is capable of performing a radio measurement which meets one or more requirements related to the radio measurement provided the IDC configuration meets a certain condition Action 1202.

The user equipment 10 receives, from the network node, the IDC configuration for at least one IDC scheme.

Action 1203.

The user equipment 10 may determine that the received IDC configuration meets the certain condition. E.g. the IDC autonomous denial parameters comprises that not more than M IDC autonomous denial subframes are configured over certain IDC autonomous denial validity period. The certain range of parameters may comprise a certain IDC subframe pattern. The certain range of parameters comprises that at least M number of subframes are available for E-UTRAN operation over a certain time period. The certain range of parameters may comprise a list of one or more subframe patterns indicating which Hybrid Automatic Repeat Request, HARQ, process Evolved Universal Terrestrial Radio Access Network, E-UTRAN, is required to abstain from using.

Action 1204.

The user equipment 10 performs a radio measurement which meets one or more requirements related to the radio measurement provided the received IDC configuration meets a certain condition. The certain condition may comprise that the received IDC configuration comprises a certain range of parameters. The certain range of parameters may comprise certain IDC autonomous denial parameters. Examples of IDC autonomous denial parameters are autonomousDenialSubframes and autonomousDenialValidity.

Figure 13:
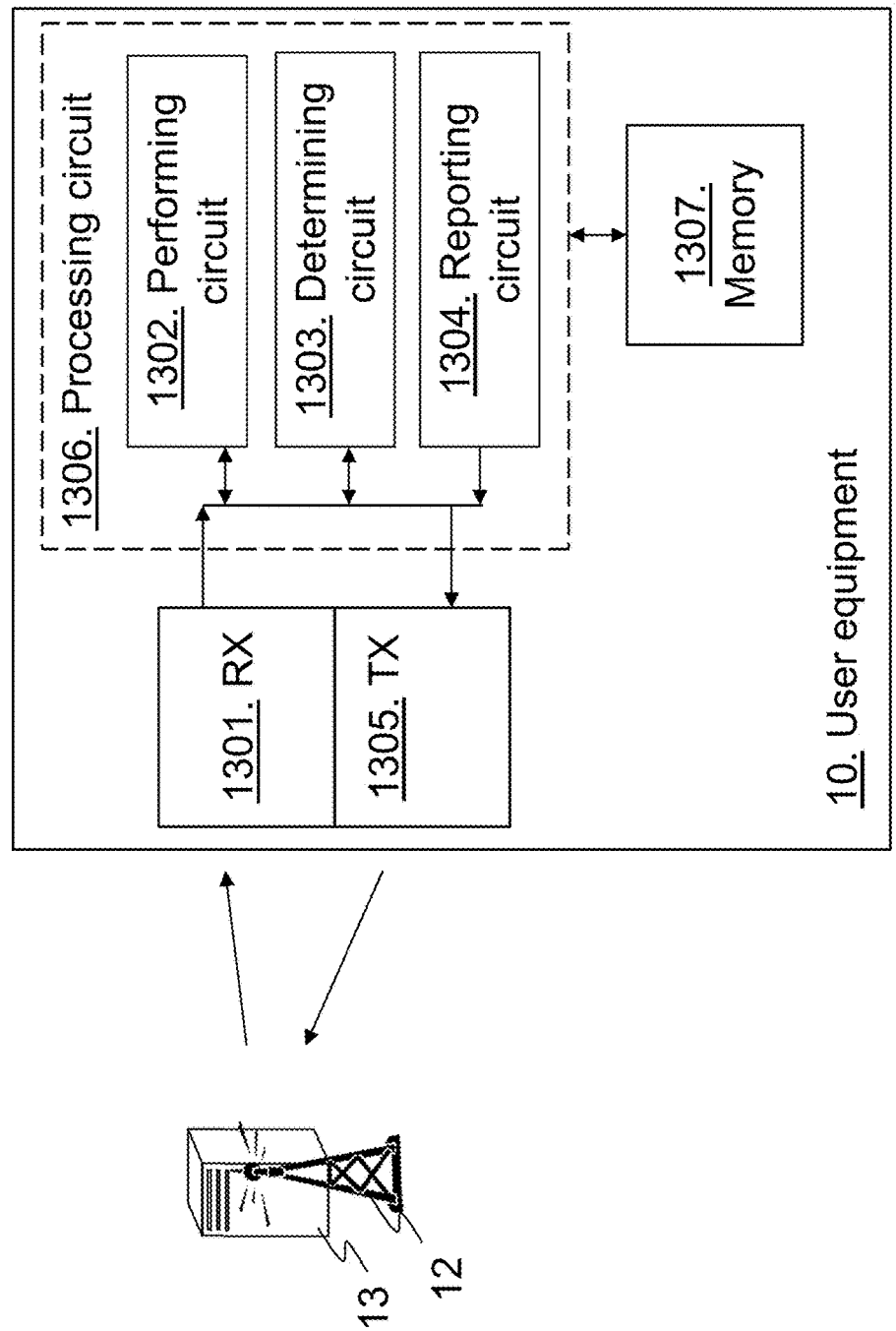
FIG. 13 is a block diagram depicting a user equipment according to embodiments herein.

In order to perform the method a user equipment is provided. FIG. 13 shows a user equipment 10 according to embodiments herein. The user equipment 10 is adapted for performing a radio measurement in the communications network 1. The user equipment 10 is IDC capable and is configured to be served by the network node in the communications network.

The user equipment 10 comprises a receiver (RX) 1301 configured to receive, from the network node, the IDC configuration for at least one IDC scheme.

The user equipment 10 further comprises a performing circuit 1302 configured to perform a radio measurement which meets one or more requirements related to the radio measurement provided the received IDC configuration meets a certain condition. The certain condition may comprise that the received IDC configuration comprises a certain range of parameters. The certain range of parameters may e.g. comprise certain IDC autonomous denial parameters. The IDC autonomous denial parameters may comprise that not more than M IDC autonomous denial subframes are configured over certain IDC autonomous denial validity period. In some embodiments, the certain range of parameters comprises certain IDC subframe pattern. The certain range of parameters may comprise that at least M number of subframes are available for E-UTRAN operation over certain time period. The certain range of parameters may comprise a list of one or more subframe patterns indicating which HARQ process E-UTRAN is required to abstain from using.

The user equipment 10 may further comprise a determining circuit 1303 configured to determine that the received IDC configuration meets the certain condition.

In addition, the user equipment 10 may comprise a reporting circuit 1304 configured to report capability of the user equipment 10 to the network node, e.g. by transmitting a report of capability to the network node. The capability indicates that the user equipment 10 is capable of performing a radio measurement which meets one or more requirements related to the radio measurement provided the IDC configuration meets the certain condition.

Furthermore, the user equipment 10 comprises a transmitter (TX) 1305. The transmitter 1305 and receiver 1301 may be implemented as a transceiver in the user equipment 10.

The embodiments herein for performing a radio measurement in the communications network 1 may be implemented through one or more processors, such as a processing circuit 1306 in the user equipment 10 depicted in FIG. 13, together with computer program code for performing the functions and/or method steps of the embodiments herein. The program code mentioned above may also be provided as a computer program product, for instance in the form of a data carrier carrying computer program code for performing embodiments herein when being loaded into the user equipment 10. One such carrier may be in the form of a CD ROM disc. It is however feasible with other data carriers such as a memory stick. The computer program code may furthermore be provided as pure program code on a server and downloaded to the user equipment 10.

The user equipment 10 further comprises a memory 1307 that may comprise one or more memory units and may be used to store for example data such as, conditions, requirements, measurements, capability an application to perform the methods herein when being executed on the user equipment or similar.

According to one variant a method implemented in the user equipment 10 is provided, to determine when an autonomous denial can be applied based on measurement time is provided, the method comprising: a) Determining the conditions for the measurements at the user equipment 10; b) Adapting the autonomous denial time, if the requirements are met.

According to a further variant the user equipment 10 is provided, comprising a processor and memory devices configured to determine when an autonomous denial can be applied based on measurement time is provided, the processor is further configured to: a) Determining the conditions for the measurements at the user equipment 10; b) Adapting the autonomous denial time, if the requirements are met.

According to a further variant a method implemented in the user equipment to adjust the sampling time for radio measurements based on the inactivity period in the DL or UL time is provided.

Figure 14:
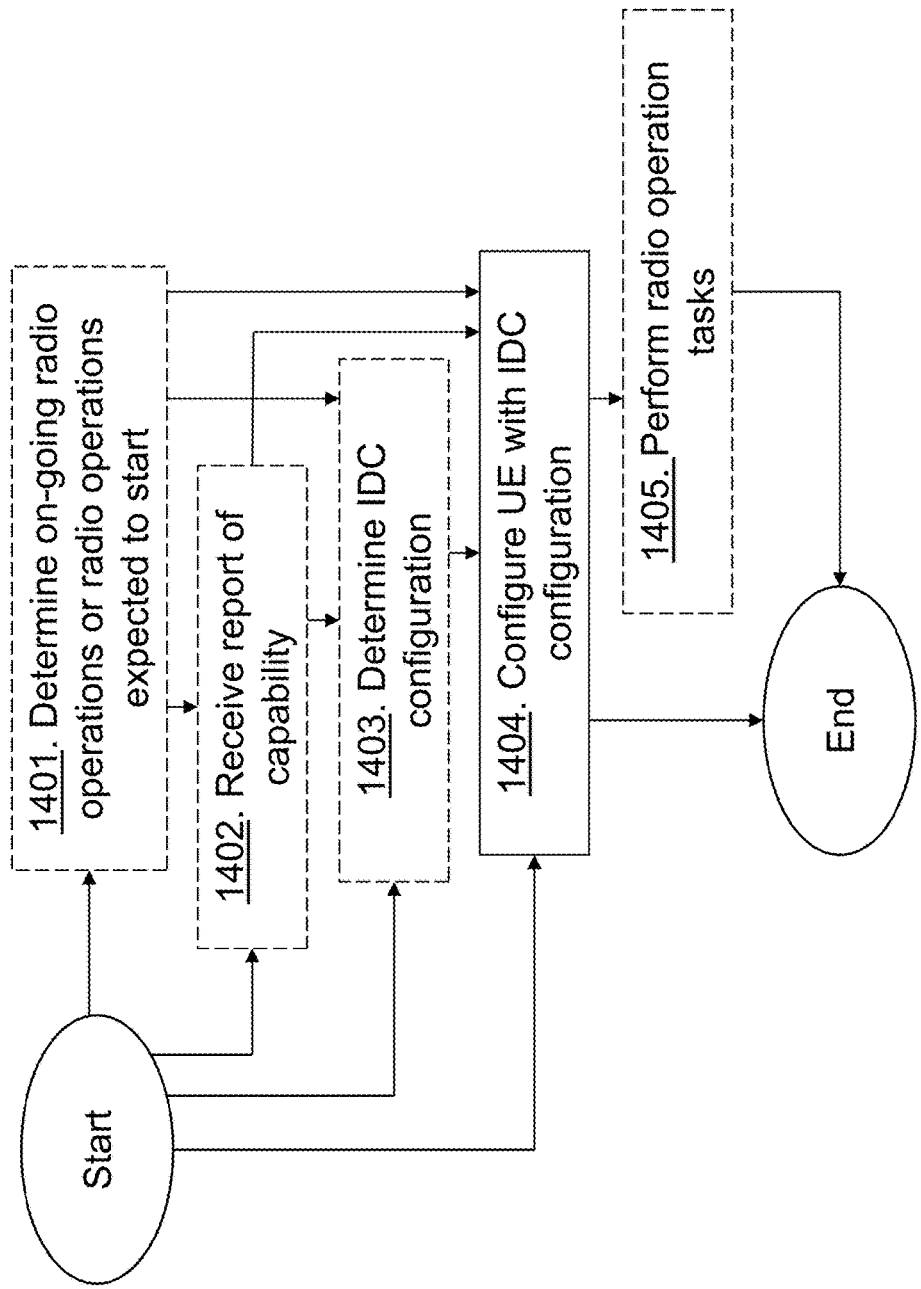
FIG. 14 is a schematic flow chart depicting a method in a network node according to embodiments herein.

The method actions in the network node, referred to as radio base station 12 and/or positioning node 13 in the figures, may also be a D2D user equipment, for enabling the user equipment 10 to perform a radio measurement in the communications network according to some embodiments will now be described with reference to a flowchart depicted in FIG. 14. The actions do not have to be taken in the order stated below, but may be taken in any suitable order. Actions performed in some embodiments are marked with dashed boxes.

Action 1401.

The network node may determine on-going radio operations or radio operations expected to start and the network node may then in action 1404 below take the on-going radio operations into account when configuring the user equipment 10.

According to some embodiments herein a method in the network node to determine the allowed denial time by the user equipment 10 based on one or more radio operations which are on-going or which are expected to start is disclosed. Examples of radio operations are radio measurements performed by the user equipment 10 and/or radio network, scheduling of data, e.g. higher priority data, criticality level of the on-going service, e.g. emergency call, positioning session, etc.

As explained earlier, the network node, e.g. serving eNode B, indicates the maximum number of autonomously denied subframes and the validity period over which the denied subframes are counted.

According to the some embodiments if there is one or more on-going radio operations or if they are about to start then the serving radio node serving the user equipment 10 adapts the IDC configuration sent to the user equipment 10. The ID configuration includes parameters such as autonomous denial subframes and the autonomous denial validity fields. The adaptation of IDC configuration which takes into account one or more radio operations comprises one or more of the following, but not limited to these examples:

Sending the IDC configuration with certain delay: For example this may be sent with the delay when the network node and/or the user equipment 10 has completed the on-going radio operation. The delay depends upon the type of radio operations e.g. scheduling of data, measurement, positioning session etc. A shorter delay, e.g. 10 ms, might be needed in case the operation task is scheduling the data. That means the network node first schedule all or most of the data and then send IDC configuration to allow the denials. However for measurement and in particular for the positioning measurement the delay can be longer e.g. 200 ms to 1 second. In particular when network node performs measurement itself on at least UE UL signals then it may delay sending the IDC configuration to the user equipment 10.

Sending the IDC configuration with limited configuration parameter(s) value: In this case the network node may only allow the user equipment 10 to have limited configuration e.g. total number of denial subframes not more than 10. The configuration parameters are adapted to the operations that are on-going or to be configured by the network such as measurements. In this way the impact of idle subframes created by the user equipment 10 on the on-going radio operations will be reduced or minimized. Therefore performance degradation may be reduced.

Combination of sending the IDC configuration with delay and limited configuration parameter(s) value: This method can be used by the network node when for example different radio operation tasks are performed over longer period of time e.g. scheduling followed by radio measurements etc.

The network node may also take into account the information related to radio tasks received from other nodes, e.g. from the positioning node 13 when the network node is e.g. the radio base station 12, and/or the user equipment 10 when determining when to adapt the IDC configuration and what type of adaptation should be applied. For example information related to positioning, e.g. E-CID, OTDOA etc, received from positioning node 13 and/or indication from the user equipment 10 and/or determined by cross layer communication, e.g. by reading LPP messages sent between the user equipment 10 and positioning node 13 in LTE.

Action 1402.

The network node may receive the report from the user equipment 10 indicating capability of the user equipment 10. The capability indicates that the user equipment 10 is capable of performing a radio measurement which meets one or more requirements related to the radio measurement provided the IDC configuration meets a certain condition.

Action 1403.

The network node may determine the IDC configuration according to a rule, corresponding to the condition checked at the user equipment 10, that will ensure consistent user equipment behaviour and/or will ensure that the user equipment 10 meets one or more requirements related to the radio measurement. The determination of the IDC configuration may be based on the received capability.

Action 1404.

The network node configures the user equipment 10 with an IDC configuration for at least one IDC scheme, which IDC configuration enables the user equipment 10 to perform a radio measurement which meets one or more requirements related to the radio measurement provided the IDC configuration meets a certain condition. The certain condition may comprise that the received IDC configuration comprises a certain range of parameters. Th certain range of parameters may comprise certain IDC autonomous denial parameters. The IDC autonomous denial parameters may in its turn comprise that not more than M IDC autonomous denial subframes are configured over certain IDC autonomous denial validity period. The certain range of parameters may alternatively comprise a certain IDC subframe pattern. The certain range of parameters may e.g. comprise that at least M number of subframes are available for E-UTRAN operation over certain time period. The certain range of parameters comprises a list of one or more subframe patterns indicating which HARQ process E-UTRAN is required to abstain from using.

Action 1405.

The network node may perform one or more radio operation tasks or actions based on the received capability and/or the IDC configuration.

Figure 15:
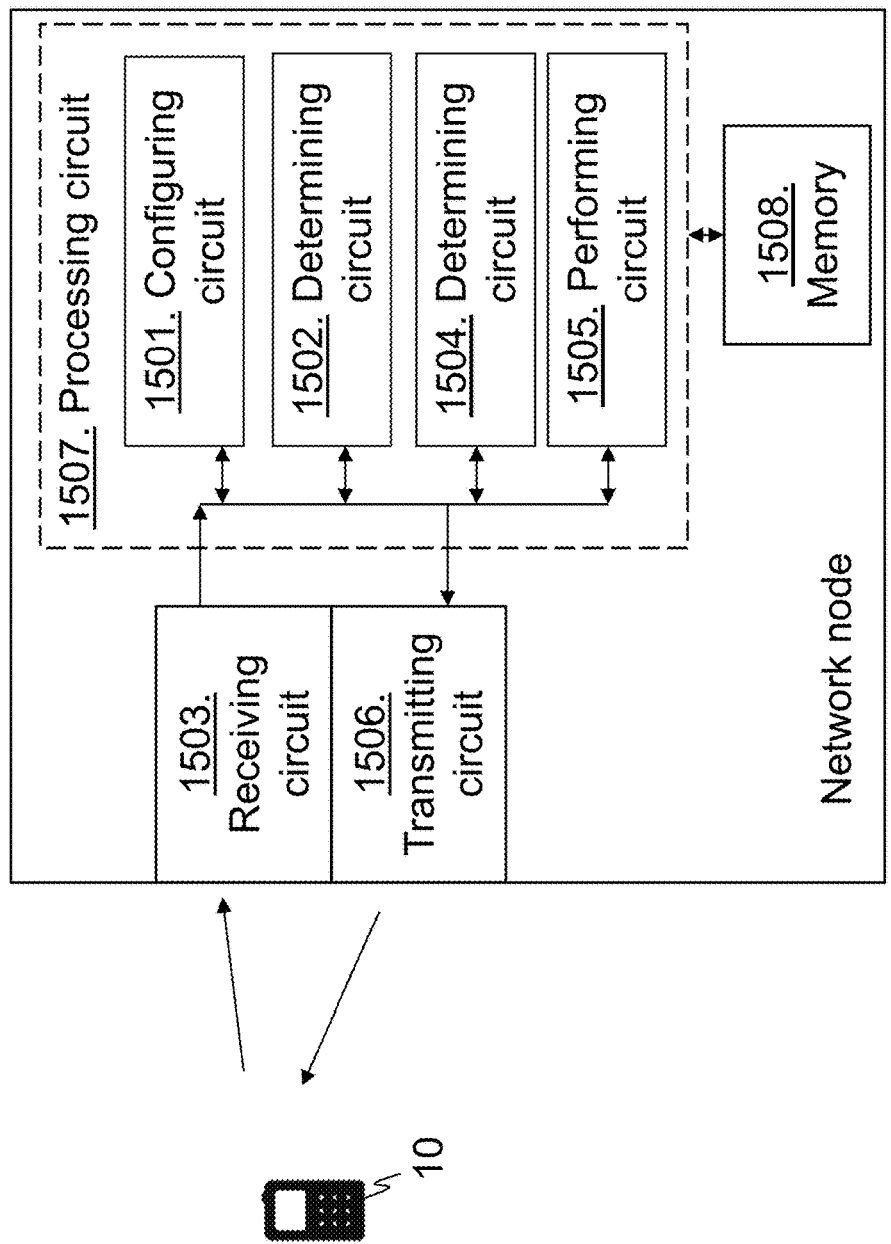
FIG. 15 is a block diagram depicting a network node according to embodiments herein.

In order to perform the method a network node is provided. FIG. 15 shows a network node according to embodiments herein. The network node, exemplified herein as the radio base station 12, the positioning node or a D2D UE is adapted for enabling the user equipment 10 to perform a radio measurement in the communications network 1. The user equipment 10 is IDC capable and the network node is configured to serve the user equipment 10 in the communications network.

The network node comprises a configuring circuit 1501 adapted to configure the user equipment 10 with an IDC configuration for at least one IDC scheme. The IDC configuration enables the user equipment 10 to perform a radio measurement which meets one or more requirements related to the radio measurement provided the IDC configuration meets a certain condition. As previously mentioned, the certain condition may comprise that the received IDC configuration comprises a certain range of parameters. The certain range of parameters may comprise certain IDC autonomous denial parameters. The IDC autonomous denial parameters may comprise that not more than M IDC autonomous denial subframes are configured over certain IDC autonomous denial validity period. The certain range of parameters may comprise certain IDC subframe pattern. The certain range of parameters may comprise that at least M number of subframes are available for E-UTRAN operation over certain time period. The certain range of parameters may comprise a list of one or more subframe patterns indicating which HARQ process E-UTRAN is required to abstain from using.

The network node may further comprise a determining circuit 1502 configured to determine the IDC configuration according to a rule that will ensure consistent user equipment behaviour and/or will ensure that the user equipment meets one or more requirements related to the radio measurement.

The network node further comprises a receiving circuit 1503 that may be configured to receive a report from the user equipment 10 indicating capability of the user equipment 10. The capability indicates that the user equipment 10 is capable of performing a radio measurement which meets one or more requirements related to the radio measurement provided the IDC configuration meets the certain condition.

The network node may further comprise a determining circuit 1504 configured to determine the IDC configuration based on the received capability.

Additionally or alternatively, the network node may comprise a performing circuit 1505 configured to perform one or more radio operation tasks or actions based on the received capability.

Furthermore, the network node comprises a transmitting circuit 1506. The transmitter 1305 and receiver 1301 may be implemented as a transceiver in the user equipment 10.

The embodiments herein for enabling the user equipment 10 to perform the radio measurement in the communications network 1 may be implemented through one or more processors, such as a processing circuit 1507 in the network node depicted in FIG. 15, together with computer program code for performing the functions and/or method steps of the embodiments herein. The program code mentioned above may also be provided as a computer program product, for instance in the form of a data carrier carrying computer program code for performing embodiments herein when being loaded into the network node. One such carrier may be in the form of a CD ROM disc. It is however feasible with other data carriers such as a memory stick. The computer program code may furthermore be provided as pure program code on a server and downloaded to the network node.

The network node further comprises a memory 1508 that may comprise one or more memory units and may be used to store for example data such as, conditions, requirements, measurements, capability, an application to perform the methods herein when being executed on the network node or similar.

According to some embodiments herein a method in the network node, such as a radio network node, a positioning node, a SON node, an MDT node, or a D2D UE is disclosed herein comprising: Determining or predicting UE autonomous denials; Adapting one or more radio procedures based on determined UE autonomous denials.

The method may be implemented in any network node serving the user equipment 10 or communicating with the user equipment 10 or configuring a user equipment 10. Examples of the network nodes are base station, Node B, eNode B, relay node, donor node serving a relay node, mobile relay, BSC, RNC, positioning node, MDT, SON, OSS, O&M, LMU, any UL measuring node performing positioning measurement etc.

In case of D2D communication the method can be implemented in UEs, which are D2D capable i.e. can communicate with other UE(s).

According to a further variant a method is provided in the network node, for extending the measurement period based on conditions that indicate a UE denial.

According to a further variant the network node is provided comprising a processor and memory and being adapted to extending the measurement period based on conditions that indicate a UE denial.

According to a further variant the conditions that indicate a UE denial is a signal quality measure falling under a certain threshold According to a further variant the conditions that indicate a UE denial is based on ACK/NACK feedback in response to dummy downlink transmission According to a further variant the conditions that indicate a UE denial is based on triggering transmission of an uplink known signal.

According to a further variant a method is provided a method in the network node is provided to determine the allowed autonomous denial time based on its own measurement period.

According to a further variant the network node is provided comprising a processor and memory and being adapted to determine the allowed autonomous denial time based on its own measurement period.

According to a further variant a method in the network node is provided, to adapt scheduling to the perceived denied subframes from the user equipment 10, such that scheduling strategy depends on how much of the allowed denial subframes have been consumed by the user equipment 10.

According to a further variant a radio network node is provided comprising a processor and memory and being adapted to adapt scheduling to the perceived denied subframes from the user equipment 10, such that scheduling strategy depends on how much of the allowed denial subframes have been consumed by the user equipment 10.

The network node perceives or configures the user equipment 10 with an IDC configuration for at least one IDC scheme for the user equipment 10. The IDC configuration may comprise one or more of the following: IDC autonomous denial, IDC subframe pattern, and DRX configuration. In some embodiments the network node may receive, from the user equipment 10, information related to denial periods over which the user equipment 10 does not operate on Evolved Universal Terrestrial Radio Access Network, E-UTRAN or on UTRAN. The network node may then determine or predict time instance when user equipment 10 will apply autonomous denial due to IDC. In some embodiments the network node may implicitly determine autonomous denial by at least one of: comparing signal quality measure to a threshold, detecting absence of ACK/NACK feedback sent by the user equipment 10 for the downlink dummy data sent to the user equipment 10; and detecting absence of an uplink transmission of a known uplink signal in at least a certain subframe.

The perception of the UE denial can be based on explicit signalling from the user equipment 10 that certain subframes will be denied, or implicitly realized by the radio network node. These two mechanisms are described below:

Explicit Determination of UE Autonomous Denial

In case of UE indication mechanism, the user equipment 10 may signal information related to a pattern of expected denial periods valid over certain time e.g. valid over the next 5 seconds to the network node. If the user equipment 10 is involved in D2D communication then it may signal this to other UEs involving in D2D communication. Alternatively the network node receiving the information related to the pattern from UE1 which applies the denial due to IDC may signal this information to UE2 where UE1 and UE2 are in D2D communication mode. Yet another alternative is that the D2D directly receives the information as well as it receives from the network node to improve the accuracy of the information or reliability of the information.

The pattern may indicate one or more of the following parameters associated with the pattern information: reference time to start the pattern of denial, e.g. system frame number (SFN), size of each denial e.g. N subframes, frequency or rate of denial, purpose of denial, e.g. use of WLAN, GNSS, Bluetooth etc. The user equipment 10 may also signal statistics of one or more denial pattern or denials used by the user equipment 10 in the past. The user equipment may signal this information for denial of UL subframes, DL subframes or both. Based on this received information the network node can determine or predict the time instances when the user equipment 10 will apply the autonomous denial due to IDC. Similarly based on this received information the D2D UE, e.g. UE2, receiving the information can determine or predict the time instances when the user equipment 10, e.g. UE1, with which it is in D2D communication will apply the autonomous denial. Below the network node is differentiated from the second D2D UE, however, as stated above the network node may be a D2D UE.

Implicit Determination of UE Autonomous Denial

Some examples of implicit realization at the network node or at the D2D UE of the autonomous subframe denial by UE, i.e. UE1 in case of D2D, are as follows. More specifically the implicit determination is done by a radio network node, which can typically be a serving radio node or can be done by the D2D UE, i.e. by UE2:

Comparing Some Signal Quality Measure to a Threshold

In case of denying an uplink subframe, if a signal measurement quantity, e.g. such as SNR, SINR, BER, BLER etc, falls below a certain threshold, the network node or D2D UE can assume a UL denial by the user equipment 10 i.e. the user equipment 10 does not transmit any signal in that subframe. The network node or D2D UE may especially observe the UL signal quality in subframes in which the UE is scheduled for UL transmission. If signal quality is below a threshold then it is expected that the UE has denied that subframe.

ACK/NACK Feedback Based on Dummy DL

According to this method the network node or D2D UE, i.e. UE2 sends dummy data in the DL to the user equipment 10, i.e. to UE1 in case of D2D UE, and if no ACK/NACK is received from the user equipment 10 in certain subframes by the said network node or D2D UE then it may assume these subframes as subframes denied by UE. One trigger for transmission of the dummy data transmission in the DL is when the network node or D2D UE sends the maximum allowed denial subframes to the user equipment 10 e.g. 30 subframe i.e. 30 ms. The dummy data may comprise of random data which can be sent to the user equipment 10 over a data channel e.g. PDSCH in the DL.

Triggering Transmission of an Uplink Known Signal

According to this method the network node or D2D UE may use any type of known signal or sequence that can be used to verify the presence of UL transmission. If the network node or D2D UE determines that no signal is present, i.e. not received at the network node or D2D UE, then it means that the user equipment 10 is in UL denial. Examples of known UL signals are CSI reports, e.g. CQI, RI, PMI etc, SRS, DMRS, ACK/NACK or any UL reference or pilot signals etc.

For example the network node or D2D UE can configure the user equipment 10 with a CSI reporting with higher frequency e.g. once every 2 ms. If the CSI report is not received in certain subframes then the network node or D2D UE may assume that that UL subframe is denied by the user equipment 10.

Upon determining the autonomous denial executed by the user equipment 10 due to IDC e.g. pattern of the autonomous denial or each individual denial as described above, the radio network or D2D UE may adapt one or more radio operational tasks to compensate for the UE autonomously denial subframes. Examples of such tasks are:

Adapting One or More Parameters Related to Signal Measurement

For example in case of measurement adaptation, the network node and/or D2D UE may extend the measurement period depending upon the amount of denials etc. In case of network node the adaptation of parameter(s) is done for UL measurements. In case of D2D UE the adaptation of parameter(s) can be done for UL and/or DL measurements performed on signals transmitted by or to the user equipment 10 which is doing autonomous denial. For example the radio node or D2D may measure SINR over 200 ms instead of 100 ms in case the total denial over 100 ms is 20 ms or more.

Adjusting Scheduling of Data in UL and/or DL

For example in case of scheduling adaptation, the network node or D2D UE (i.e. UE2) may avoid scheduling those subframes which are expected to be denied by the user equipment 10 (i.e. UE1 in case of D2D UE) based on the perceived pattern or statistics of denial. In yet another example the radio node or D2D UE may use more robust transport format, e.g. lower order modulation like QPSK and/or lower code rate like 1/3, for scheduling of data to ensure that the user equipment 10 is able to receive the data with success as much as possible during the available subframes, i.e. which are not denied by the user equipment

10. In this way overall system performance, e.g. bit rate, throughput, is not degraded due to autonomous denial.

Adapting Configuration Parameter(s) Related to UE Measurement

For example in this case the network node and/or D2D UE may modify one or more configuration parameter related to the UE measurements of the user equipment 10 doing autonomous denial, i.e. measurement performed by UE1 in case of D2D UE. These parameters are sent to the user equipment 10 doing measurement to enhanced measurement performance. In one example the network node or D2D UE may configure much longer time to trigger (TTT) parameter value e.g. from 640 ms to 1280 ms. In another example higher layer averaging parameter value, e.g. L3 filtering co-efficient value, can be extended e.g. from 0.5 second to 1 second. In yet another example the measurement BW over which the measurement is done can be extended e.g. from 25 Resource Blocks (RB) (5 MHz) to 50 RBs (10 MHz). The adaption of measurement configuration parameters, e.g. extending the value, will improve the measurement accuracy when the user equipment 10 cannot perform measurement in certain subframes due to idle periods created by the autonomous denial.

Selecting Another UE for D2D Communication

The network node managing D2D communication and/or the D2D UE itself, i.e. UE2, may decide to select another UE, e.g. a UE3, for establishing D2D communication in case the existing UE, i.e. UE1, causes large number of denials and/or frequent denials. Especially if the D2D communication involves delay sensitive service or critical service like positioning or emergency call etc. then the network node and/or D2D UE may select another UE, not causing denials or causing fewer denials than UE1, for D2D communication.

Adapting One or More Parameters Related to Positioning

For example the positioning node 13, e.g. E-SMLC in LTE, adapts the positioning configuration, e.g. assistance data for positioning, sent to the user equipment 10 while taking into account the IDC autonomous denials e.g. carrier frequency on which measurement is done, selection between different positioning measurements for positioning, e.g. E-CID RSRP and AoA, selection between different positioning methods, e.g. E-CID and OTDOA, delaying in sending the positioning configuration for certain time until the IDC denials are completed etc. The positioning node 13 may also acquire the information related to IDC configuration sent the radio network node to the user equipment 10 in addition to the pattern of the IDC denials applied by the user equipment 10. The former information be acquired by the positioning node 13 from the serving radio node (over LPPa) of the user equipment 10 or from the user equipment 10 itself (over LPP). The positioning node 13 may also forward the received information related to the IDC configuration and/or the pattern of the IDC denials to other nodes such as measuring node performing positioning measurements, e.g. LMU. The measuring node may use this information to adapt its configuration related to measurement e.g. only measure on UE signals in those subframes which are not denied by the user equipment 10.

Adapting Radio Operation Depending Upon Completion Level of Denial

Another embodiment of the disclosure the network node or D2D UE determines when the total number of denial subframes is completed during the validity period. The determination can be done by explicit and/or implicit mechanism described earlier. For example the network can configure the user equipment 10 with a validity period of 1 second and the maximum number of allowed denial subframes of 30 ms. Depending upon the IDC scenario the user equipment 10 may complete the total allowed denial over initial 200 ms. Therefore the network node and/or user equipment 10 may adapt the radio operation after 200 ms. For example a different radio operational parameters for the same type of procedure before and after the maximum denial is completed during the validity period. In other words the radio operational parameters can be different during initial 200 ms and during the remaining 800 ms.

According to one aspect a method in the IDC capable user equipment 10 served by the network node of performing at least one radio measurement is provided. The method comprises, Receiving a configuration for at least one IDC scheme, e.g. autonomous denial, IDC subframe etc, from the network node to avoid interference towards in-device external wireless system;

Adapting one or more of the following: measurement time or evaluation time, measurement sampling rate, creation of the IDC autonomous gaps, without E-UTRAN operation, with respect to the measurement sampling, wherein the adaptation is based on one or more configured IDC parameters;

Performing the measurement based on the adaptation;

Using the performed measurement for one or more radio operation tasks, e.g. reporting results to the network, performing cell change, radio link monitoring etc.

According to another aspect a method in the network node serving the IDC capable user equipment 10 is provided. The method comprises:

Configuration the user equipment 10 with at least one IDC scheme, e.g. autonomous denial, IDC subframe etc, enabling it to create IDC gaps without E-UTRAN operation avoid interference towards in-device external wireless system;

Adapting one or more radio operational procedures depending upon the IDC gaps created by the user equipment 10 according to configured IDC scheme, which adaptation is one or more of the following:

Extending the measurement period based on condition(s) that indicates the UE denial. The condition(s) can be a signal quality measurement by comparing to a threshold or feedback response to dummy data transmission;

Determining the allowed autonomous denial time based on its own measurement period.

Adapting scheduling to the perceived denied subframes from the user equipment 10, such that e.g. when user equipment 10 has consumed all of its allowed denial subframes within the validity time, the network node can schedule the user equipment 10 more aggressively.

Configuring measurement gaps or a measurement requiring autonomous gaps, e.g. CGI, such that they don't overlap with the IDC gaps in which there is no E-UTRAN operation.

According to a further aspect a method in the IDC capable user equipment 10 served by the network node and capable of performing at least one radio measurement is provided. The method comprises, Reporting its capability to the network node whether it is capable of adapting one or more of measurement time or evaluation time, measurement sampling rate, creation of the IDC autonomous gaps, without E-UTRAN operation, with respect to the measurement sampling and/or meeting one or more pre-defined rule and/or requirements related to measurement when configured with one or more IDC parameter.

At least according to some embodiments and aspects the methods and apparatuses provide that the interference avoidance for IDC will not impact the measurements at the user equipment 10 and the network node, or will at least alleviate such problems At least according to some embodiments and aspects the methods and apparatuses provide that the E-UTRAN procedures are not interrupted while the user equipment 10 is configured with any of the schemes for interference avoidance for IDC, or will at least reduce such issues.

At least according to some embodiments and aspects the methods and apparatuses provide that the UE requirements are met when the user equipment 10 is configured with any of the scheme for interference avoidance for IDC.

At least some of the methods and devices more specifically allow the measuring node to optimize the measurement period and measurement sampling time based on the solution that is used for IDC interference avoidance.

At least some of the methods enable consistent behavior in terms of measurements, data scheduling etc when user equipment 10 is configured with any of the IDC scheme.

At least some of the embodiments provide methods of measurements when IDC interference avoidance is used.

At least some of the methods and devices also enable adaptation of the parameters related to the IDC interference avoidance solutions to protect the radio related measurement operations.

The methods, devices, apparatuses and circuits summarized above can be used to improve the performance of user equipment and network nodes, such as Node B, positioning node, D2D UE, eNodeB, RBS etc. in different radio communication technologies supporting devices with co-existing radio transmission/reception, for example. Of course, the present disclosure is not limited to the above-summarized features and advantages. Indeed, those skilled in the art will recognize additional features and advantages upon reading the following detailed description, and upon viewing the accompanying drawings.

Embodiments herein are described above with reference to the accompanying drawings, in which examples of embodiments are shown. Embodiments may, however, be embodied in many different forms and should not be construed as limited to the embodiments set forth herein. It should also be noted that these embodiments are not mutually exclusive. Thus, components or features from one embodiment may be assumed to be present or used in another embodiment, where such inclusion is suitable.

The network node, e.g. serving radio node 12, positioning node 13 etc, may also take one or more action based on one or more pre-defined rules. For instance in preceding exemplary pre-defined rules the network node may not configure both measurement gaps and IDC scheme at the same time for the same UE.

In another example the network node may configure both measurement gaps and IDC scheme at the same time for the same user equipment 10 provided the IDC gaps and certain specific signals, which are received and/or transmitted by the user equipment 10 don't overlap or at least only partially overlap.

Embodiments herein are described with reference to the accompanying drawings, in which examples of embodiments are shown. However, solutions may be embodied in many different forms and should not be construed as limited to the embodiments set forth herein. It should also be noted that these embodiments are not mutually exclusive. Thus, components or features from one embodiment may be assumed to be present or used in another embodiment, where such inclusion is suitable.

For purposes of illustration and explanation only, these and other embodiments of the present disclosure are described herein in the context of operating in a RAN that communicates over radio communication channels with wireless terminals, also referred to as user equipment, or "UEs". More particularly, specific embodiments are described in the context of systems using Wideband Code-Division Multiple Access (W-CDMA) technology and/or High-Speed Downlink Packet Access (HSDPA) technology, as standardized by the membership of the $3^{rd}$ Generation Partnership Project (3GPP). It will be understood, however, that the present disclosure is not limited to such embodiments and may be embodied generally in various types of communication networks. As used herein, the terms mobile terminal, wireless terminal, or user equipment can refer to any device that receives data from a communication network, and may include, but are not limited to, a mobile telephone ("cellular" telephone), laptop/portable computer, pocket computer, hand-held computer, and/or desktop computer.

Also note that the use of terminology such as "base station", which may be referred to in various contexts as NodeB or radio base station, for example, and "wireless terminal," "mobile terminal," or "wireless device", often referred to as "UE" or "User Equipment", should be considering non-limiting and does not necessarily imply a certain hierarchical relation between two particular nodes of a communication link. In general, a base station, e.g., a "NodeB", and a wireless terminal, e.g., a "UE", may be considered as examples of respective different communications devices that communicate with each other over a wireless radio channel. While embodiments discussed herein may focus on wireless transmissions in a downlink from a NodeB to a UE, the disclosed techniques may also be applied, for example, to uplink transmissions in some contexts. As a result, several embodiments described in detail below, including modified versions of the receiver circuit 1301, 1501 pictured in FIGS. 13,15, may be suitable for use in various wireless terminals, base stations, or both. It will be appreciated, of course, that the details of accompanying circuitry, including antennas, antenna interface circuits, radio-frequency circuits, and other control and base band circuits, will vary, depending on the specific application of the techniques disclosed herein. Because these details are not necessary to a complete understanding of the present embodiments, those details are generally omitted in the following discussion and in the accompanying figures.

As will be readily understood by those familiar with communications receiver design, the several functions disclosed herein may be implemented using digital logic and/or one or more microcontrollers, microprocessors, or other digital hardware. In some embodiments, several or all of the various functions may be implemented together, such as in a single application-specific integrated circuit (ASIC), or in two or more separate devices with appropriate hardware and/or software interfaces between them. Several of the methods may be implemented on a processor shared with other functional components of a wireless terminal, for example.

Alternatively, several of the functional elements of the transceiver processing circuits discussed above may be provided through the use of dedicated hardware, while others are provided with hardware for executing software, in association with the appropriate software or firmware. Thus, the term "processor" or "controller" as used herein does not exclusively refer to hardware capable of executing software and may implicitly include, without limitation, digital signal processor (DSP) hardware, read-only memory (ROM) for storing software, random-access memory for storing software and/or program or application data, and non-volatile memory. Other hardware, conventional and/or custom, may also be included. Designers of communications receivers will appreciate the cost, performance, and maintenance tradeoffs inherent in these design choices.

It will be appreciated that the foregoing description and the accompanying drawings represent non-limiting examples of the methods and apparatus taught herein. As such, the apparatus and techniques taught herein are not limited by the foregoing description and accompanying drawings. Instead, the present disclosure is limited only by the following claims and their legal equivalents.

ABBREVIATIONS

BS Base Station
CID Cell Identity
CRS Cell-specific Reference Signal
DL Downlink
ID Identity
IDC In-Device Coexistence
ISM Industrial, Scientific and Medical
L1 Layer 1
L2 Layer 2
LTE Long Term Evolution
MAC Medium Access Control
MDT Minimization of drive test
OFDM Orthogonal Frequency Division Multiplexing
PBCH Physical Broadcast Channel
PCFICH Physical Control format Indicator
PDCCH Physical Downlink Control Channel
PDSCH Physical Downlink Shared Channel
PHICH Physical Hybrid ARQ Indicator Cahnnel
PSS Primary Synchronization Signal
RAT Radio Access Technology
RE Resource Element
RB Resource Block
RRM Radio Resource Management
RSRQ Reference signal received quality
RSRP Reference signal received power
SFN Single Frequency Network
SRS Sounding Reference Signal
SSS Secondary Synchronization Signal
UE User Equipment
UL Uplink
RSTD Reference signal time difference
SON Self Organizing Network
RSSI Received signal strength indicator
O&M Operational and Maintenance
OSS Operational Support Systems
OTDOA Observed time difference of arrival

What is claimed is:

1. A method in a user equipment which is In Device Coexistent, IDC, capable and being served by a network node in a communications network, the method comprising:
    receiving, by the user equipment from the network node, an IDC configuration; and
    performing a radio measurement which meets one or more requirements related to the radio measurement provided the received IDC configuration meets a certain condition where the received IDC configuration comprises not more than a preset number of IDC autonomous denial subframes over a certain IDC autonomous denial validity period; and,
    wherein the certain condition ensures that the user equipment adapts an autonomous denial such that the adapted autonomous denial does not coincide with the measurement sampling instances but rather where the adapted autonomous denial falls within successive measurement samples whereby the successive measurement samples are saved and an accuracy of the radio measurement is not impacted so as to meet the one or more requirements.

2. The method of claim 1, further comprising:
    determining that the received IDC configuration comprises not more than the preset number of IDC autonomous denial subframes over the certain IDC autonomous denial validity period.

3. The method of claim 1, further comprising:
    reporting a capability of the user equipment to the network node, wherein the capability indicates that the user equipment is capable of performing the radio measurement which meets the one or more requirements related to the radio measurement provided the IDC configuration comprises not more than the preset number of IDC autonomous denial subframes over the certain IDC autonomous denial validity period.

4. The method of claim 1, wherein the radio measurement when performed is ensured to result in a reliable radio measurement that meets the one or more requirements because the received IDC configuration comprises not more than the preset number of IDC autonomous denial subframes over the certain IDC autonomous denial validity period.

5. The method of claim 1, wherein the radio measurement is based on multiple samples which are received over a measurement period in which the radio measurement is performed.

6. The method of claim 5, wherein a number of the multiple samples is reduced when the user equipment autonomously denies some sub-frames.

7. The method of claim 1, wherein the preset number of IDC autonomous denial subframes is 30 subframes and the certain IDC autonomous denial validity period is at least 200 milliseconds.

8. The method of claim 1, wherein:
    the radio measurement is a handover radio measurement, a positioning radio measurement, or a mobility radio measurement; and,
    the one or more requirements are pre-defined performance requirements.

9. A user equipment which is In Device Coexistent (IDC) capable and is configured to be served by a network node in a communications network, the user equipment comprising:
    a processor; and,
    a memory that stores computer program code, wherein the processor interfaces with the memory to execute the computer program code, whereby the user equipment is configured to:
        receive, from the network node, an IDC configuration; and
        perform a radio measurement which meets one or more requirements related to the radio measurement provided the received IDC configuration meets a certain condition where the received IDC configuration comprises not more than a preset number of IDC autonomous denial subframes over a certain IDC autonomous denial validity period; and
    wherein the certain condition ensures that the user equipment adapts an autonomous denial such that the adapted autonomous denial does not coincide with the measurement sampling instances but rather where the adapted autonomous denial falls within successive measurement samples whereby the successive measurement samples are saved and an accuracy of the radio measurement is not impacted so as to meet the one or more requirements.

10. The user equipment of claim 9, wherein the user equipment is further configured to:
determine that the received IDC configuration comprises not more than the preset number of IDC autonomous denial subframes over the certain IDC autonomous denial validity period.

11. The user equipment according to claim 9, wherein the user equipment is further configured to:
report a capability of the user equipment to the network node, wherein the capability indicates that the user equipment is capable of performing the radio measurement which meets the one or more requirements related to the radio measurement provided the IDC configuration comprises not more than the preset number of IDC autonomous denial subframes over the certain IDC autonomous denial validity period.

12. The user equipment of claim 9, wherein the radio measurement when performed is ensured to result in a reliable radio measurement that meets the one or more requirements because the received IDC configuration comprises not more than the preset number of IDC autonomous denial subframes over the certain IDC autonomous denial validity period.

13. The user equipment of claim 9, wherein the radio measurement is based on multiple samples which are received over a measurement period in which the radio measurement is performed.

14. The user equipment of claim 13, wherein a number of the multiple samples is reduced when the user equipment autonomously denies some sub-frames.

15. The user equipment of claim 9, wherein the preset number of IDC autonomous denial subframes is 30 subframes and the certain IDC autonomous denial validity period is at least 200 milliseconds.

16. The user equipment of claim 9, wherein:
the radio measurement is a handover radio measurement, a positioning radio measurement, or a mobility radio measurement; and,
the one or more requirements are pre-defined performance requirements.

17. A method in a network node enables a user equipment to perform a radio measurement in a communications network, wherein the user equipment is In Device Coexistent (IDC) capable and being served by the network node in the communications network, the method comprising:
configuring, by a processor in the network node, the user equipment with an IDC configuration comprising IDC autonomous denial parameters, which the IDC configuration configures the user equipment to perform the radio measurement which meets one or more requirements related to the radio measurement provided the IDC configuration meets a certain condition where the IDC configuration comprises not more than a preset number of IDC autonomous denial subframes over a certain IDC autonomous denial validity period; and,
wherein the certain condition ensures that the user equipment adapts an autonomous denial such that the adapted autonomous denial does not coincide with the measurement sampling instances but rather where the adapted autonomous denial falls within successive measurement samples whereby the successive measurement samples are saved and an accuracy of the radio measurement is not impacted so as to meet the one or more requirements.

18. The method of claim 17, further comprising:
determining, by the processor in the network node, the IDC configuration according to a rule that will at least one of (1) ensure consistent user equipment behaviour, and (2) ensure that the user equipment meets one or more requirements related to the radio measurement.

19. The method of claim 17, prior to the configuring step further comprising:
receiving, by the network node, a report from the user equipment indicating a capability of the user equipment, wherein the capability indicates that the user equipment is capable of performing the radio measurement.

20. The method of claim 19, further comprising at least one of:
determining, after the receiving step and prior to the configuring step, the IDC configuration based on the received capability; and
performing, after the configuring step, one or more radio operation tasks or actions based on the received capability.

21. The method of claim 17, wherein the configuring the user equipment with the IDC configuration ensures that the user equipment performs a reliable radio measurement that meets the one or more requirements because the IDC configuration comprises not more than a preset number of IDC autonomous denial subframes over a certain IDC autonomous denial validity period.

22. The method of claim 17, wherein the radio measurement is based on multiple samples which are received over a measurement period in which the radio measurement is performed.

23. The method of claim 22, wherein a number of the multiple samples is reduced when the user equipment autonomously denies some sub-frames.

24. The method of claim 17, wherein the preset number of IDC autonomous denial subframes is 30 subframes and the certain IDC autonomous denial validity period is at least 200 milliseconds.

25. The method of claim 17, wherein:
the radio measurement is a handover radio measurement, a positioning radio measurement, or a mobility radio measurement; and,
the one or more requirements are pre-defined performance requirements.

26. A network node configured to enable a user equipment to perform a radio measurement in a communications network, wherein the user equipment is In Device Coexistent (IDC) capable and the network node is configured to serve the user equipment in the communications network, the network node comprising:
a processor; and,
a memory that stores computer program code, wherein the processor interfaces with the memory to execute the computer program code, whereby the network node is configured to:
configure the user equipment with an IDC configuration comprising IDC autonomous denial parameters, which the IDC configuration configures the user equipment to perform the radio measurement which meets one or more requirements related to the radio measurement provided the IDC configuration meets a certain condition where the IDC configuration comprises not more than a preset number of IDC autonomous denial subframes over a certain IDC autonomous denial validity period; and, wherein the certain condition ensures that the user equipment adapts an autonomous denial such that the adapted autonomous denial does not coincide with the measurement sampling instances but rather where the adapted autonomous denial falls within successive measurement samples whereby the successive measurement samples are saved and an accuracy of the radio measurement is not impacted so as to meet the one or more requirements.

27. The network node of claim 26, wherein the network node is further configured to:
determine the IDC configuration according to a rule that will at least one of (1) ensure consistent user equipment behaviour, and (2) ensure that the user equipment meets one or more requirements related to the radio measurement.

28. The network node of claim 26, wherein the network node prior to the configure operation is further configured to:
receive a report from the user equipment indicating a capability of the user equipment, wherein the capability indicates that the user equipment is capable of performing the radio measurement which meets the one or more requirements related to the radio measurement provided an IDC configuration comprises not more than the preset number of IDC autonomous denial subframes over the certain IDC autonomous denial validity period.

29. The network node of claim 28, wherein the network node is further configured to perform at least one of following:
determine, after the receive operation and prior to the configure operation, the IDC configuration based on the received capability; and
perform, after the configure operation, one or more radio operation tasks or actions based on the received capability.

30. The network node of claim 26, wherein the configuring the user equipment with the IDC configuration ensures that the user equipment performs a reliable radio measurement that meets the one or more requirements because the IDC configuration comprises not more than a preset number of IDC autonomous denial subframes over a certain IDC autonomous denial validity period.

31. The network node of claim 26, wherein the radio measurement is based on multiple samples which are received over a measurement period in which the radio measurement is performed.

32. The network node of claim 31, wherein a number of the multiple samples is reduced when the user equipment autonomously denies some sub-frames.

33. The network node of claim 26, wherein the preset number of IDC autonomous denial subframes is 30 subframes and the certain IDC autonomous denial validity period is at least 200 milliseconds.

34. The network node of claim 26, wherein:
the radio measurement is a handover radio measurement, a positioning radio measurement, or a mobility radio measurement; and,
the one or more requirements are pre-defined performance requirements.

* * * * *